(12) United States Patent
Kastee et al.

(10) Patent No.: US 10,820,395 B2
(45) Date of Patent: Oct. 27, 2020

(54) METHODS FOR OPERATING MECHATRONIC TRANSFORMING LUMINAIRE SWARMS

(71) Applicant: ABL IP Holding LLC, Conyers, GA (US)

(72) Inventors: Jenish S. Kastee, South Riding, VA (US); Youssef F. Baker, Arlington, VA (US); Sean P. White, Reston, VA (US); Nathaniel W. Hixon, Arlington, VA (US); Daniel M. Megginson, Fairfax, VA (US); Niels G. Eegholm, Columbia, MD (US)

(73) Assignee: ABL IP HOLDING LLC, Conyers, GA (US)

( * ) Notice: Subject to any disclaimer, the term of this patent is extended or adjusted under 35 U.S.C. 154(b) by 463 days.

(21) Appl. No.: 15/689,454

(22) Filed: Aug. 29, 2017

(65) Prior Publication Data
US 2019/0069380 A1   Feb. 28, 2019

(51) Int. Cl.
*H05B 37/02* (2006.01)
*G05B 15/02* (2006.01)
*G05D 1/00* (2006.01)
*H05B 47/19* (2020.01)
*G05D 1/10* (2006.01)
(Continued)

(52) U.S. Cl.
CPC ............ *H05B 47/19* (2020.01); *G05B 15/02* (2013.01); *G05D 1/0027* (2013.01); *G05D 1/0297* (2013.01); *G05D 1/104* (2013.01); *H05B 47/155* (2020.01); *G05B 2219/39146* (2013.01); *G05B 2219/39153* (2013.01); *H04B 1/38* (2013.01);
(Continued)

(58) Field of Classification Search
CPC ............ H05B 37/0272; H05B 37/029; H05B 37/0218; H05B 37/0227; H05B 37/0236; G05B 15/02; G05B 2219/39146; G05B 2219/39153; G05D 1/0027; G05D 1/0297; G05D 1/104; H04B 1/38; H04W 84/18
USPC ........................................................ 700/245
See application file for complete search history.

(56) References Cited

U.S. PATENT DOCUMENTS

| | | | | |
|---|---|---|---|---|
| 5,521,817 A | * | 5/1996 | Burdoin | G05D 1/0027 244/190 |
| 6,049,171 A | * | 4/2000 | Stam | B60Q 1/085 250/208.1 |

(Continued)

FOREIGN PATENT DOCUMENTS

WO    WO-2009040777 A2 *   4/2009   ............. G06N 3/008

*Primary Examiner* — Kira Nguyen
(74) *Attorney, Agent, or Firm* — RatnerPrestia

(57) ABSTRACT

A method for operating a robotic agent swarm system. The method includes: sending, via a communication network, a reconfiguration instruction from an orchestration controller to a number of robotic luminaire agents, each of the robotic luminaire agents of the swarm system being held at least periodically against an architectural surface comprising a holonomic operational area by a suspension and having a light source configured to illuminate a region in a proximity of the architectural surface. The method also includes changing one or more operating conditions of one or more of the robotic luminaire agents in response to the reconfiguration instruction, including holonomically moving at least one of the robotic luminaire agents from a first position on the holonomic operational area to a second position on the holonomic operational area.

35 Claims, 14 Drawing Sheets

(51) Int. Cl.
  *G05D 1/02* (2020.01)
  *H05B 47/155* (2020.01)
  *H04W 84/18* (2009.01)
  *H04B 1/38* (2015.01)
  *H05B 47/11* (2020.01)
  *H05B 47/12* (2020.01)
  *H05B 47/105* (2020.01)

(52) U.S. Cl.
  CPC ............ *H04W 84/18* (2013.01); *H05B 47/105* (2020.01); *H05B 47/11* (2020.01); *H05B 47/12* (2020.01)

(56) References Cited

U.S. PATENT DOCUMENTS

| | | | |
|---|---|---|---|
| 6,933,486 B2 * | 8/2005 | Pitigoi-Aron | H05B 33/0857 250/205 |
| 7,327,112 B1 * | 2/2008 | Hlynka | B25J 19/0091 318/568.12 |
| 9,382,003 B2 * | 7/2016 | Burema | A01B 79/005 |
| 2010/0067244 A1 | 3/2010 | Cartwright | |
| 2011/0304633 A1 * | 12/2011 | Beardsley | B25J 9/1666 345/474 |
| 2012/0139723 A1 * | 6/2012 | Avila | G08B 21/0269 340/539.13 |
| 2012/0206050 A1 * | 8/2012 | Spero | F21V 23/0464 315/152 |
| 2013/0221852 A1 * | 8/2013 | Bowers | H05B 33/0863 315/131 |
| 2015/0120126 A1 * | 4/2015 | So | G01C 23/00 701/26 |
| 2015/0301781 A1 | 10/2015 | Ekkaia et al. | |
| 2017/0137125 A1 * | 5/2017 | Kales | B64C 39/024 |
| 2017/0221394 A1 * | 8/2017 | Garcia Morchon | G05D 1/104 |

\* cited by examiner

METHODS FOR OPERATING MECHATRONIC TRANSFORMING LUMINAIRE SWARMS

TECHNICAL FIELD

The present disclosed technologies relate generally to lighting systems, and more particularly to lighting systems using self-propelled lighting units that can autonomously move into multiple different configurations.

BACKGROUND

Conventional lighting systems for commercial spaces often feature one or more light fixtures that are installed in a ceiling or overhead support structure, or attached to the walls. The lighting fixtures can be arranged in a variety of configurations designed to provide the appropriate amount of light, and the appropriate distribution of that light, throughout the space. Once the lighting arrangement is installed, the options for changing the arrangement (e.g., moving, adding or removing a fixture, or changing the overall lighting pattern) are fairly limited. This makes it difficult to customize the arrangement to meet or adapt to certain preferences. For example, this is a particular issue in multi-use spaces that are used for different purposes or events, where each purpose or event has its own unique lighting needs, and where the space must be reconfigured from one purpose or event to another purpose or event on a frequent basis.

Conventional track lights allow the user to manually change the position of an otherwise stationary light fixture, but only within the limited confines of the track, which is typically linear and limited in length. Some track lights also allow the user to pivot the light fixture in place, so as to change the direction of illumination from that location on the track. Manual adjustment of individual light fixtures in a large space containing several light fixtures can be labor intensive and require a significant amount of downtime during which time the space cannot be used. For this reason, manually adjustable track lights are not preferred for spaces that are frequently reconfigured for different purposes.

Automation of movement has been limited. For example, there have been track lighting systems that provided motorized movement of the lighting devices along the tracks. However, such automated motion has been limited by the placement, length and shape of the track. As another example, some types of lighting devices allow controlled adjustment of the beam shape or motorized adjustment of the orientation of the source, e.g. for controllable studio lighting.

SUMMARY

Methods in the disclosed examples may resolve many of the drawbacks of conventional light fixtures by utilizing one or more self-propelled light units that can autonomously move to different configurations.

In a first example, there is provided a method for operating a robotic luminaire agent swarm system. The method includes: sending, via a communication network, a reconfiguration instruction from an orchestration controller to a plurality of robotic luminaire agents, each of the plurality of robotic luminaire agents of the swarm system being held at least periodically against an architectural surface comprising a holonomic operational area by a suspension and having a light source configured to illuminate a region in a proximity of the architectural surface; and changing one or more operating conditions of one or more of the plurality of agents in response to the reconfiguration instruction, including holonomically moving at least one of the plurality of robotic luminaire agents from a first position on the holonomic operational area to a second position on the holonomic operational area.

The suspension may be one or more first magnetic elements in the agent and the architectural surface may be one or more second magnetic elements.

Sending the reconfiguration instruction from the orchestration controller to the plurality of agents may be done by sending the reconfiguration instruction simultaneously to all of the plurality of agents.

Sending the reconfiguration instruction from the orchestration controller to a plurality of agents comprises sending the reconfiguration instruction to an initial set of one or more agents, and sending the reconfiguration instructions from the initial set of one or more agents to a subsequent set of one or more agents.

The orchestration controller may be separate from the plurality of agents, or it may be at least one of the plurality of agents.

The method may also include identifying a reconfiguration trigger and generating a reconfiguration instruction based on the reconfiguration trigger. The reconfiguration trigger may be a specific time of day and the reconfiguration instruction may be an instruction to change operating conditions of one or more of the plurality of agents. The reconfiguration trigger may be detecting a change in an environmental condition in the region in the proximity of the architectural surface, and the reconfiguration instruction may be an instruction to change operating conditions of one or more of the plurality of agents in response to the change in the environmental condition. Detecting a change in an environmental condition in the region in the proximity of the architectural surface may include detecting a respective light intensity at a plurality of measurement locations, and the reconfiguration instruction may include instructions to equalize the respective light intensities at the plurality of measurement locations, and changing one or more operating conditions of one or more of the plurality of agents in response to the reconfiguration instruction may include one or more of: changing a respective light intensity output of the respective controllable light source of the one or more of the plurality of agents, and changing a physical position of the one or more of the plurality of agents.

The reconfiguration trigger may be a reconfiguration request from a human user interface. The reconfiguration request may be a request to place a light at a user-defined location. The reconfiguration instruction may be an instruction to move one or more agents to the user-defined location. The reconfiguration request may be a request to reconfigure the one or more agents to a predetermined arrangement.

The method also may include generating the reconfiguration instruction. Generating the reconfiguration instruction may include identifying a respective current positions of each of the plurality of agents, and identifying a respective destination position for one of more of the plurality of agents; and the reconfiguration instruction may be an instruction to the one or more of the plurality of agents to move to the respective destination position. Generating the reconfiguration instruction may include identifying a respective current positions of each of the plurality of agents, identifying a respective destination position for one of more of the plurality of agents, and calculating a respective travel path from the respective current position to the respective destination position for each of the one or more of the plurality of agents; and the reconfiguration instruction may include an instruction to the one or more of the plurality of agents to proceed on the respective travel path. The method also may include identifying an observed change in the one or more operating conditions of the one or more of the plurality of agents, comparing the observed change in the one or more operating conditions of the one or more of the plurality of agents to an expected change in the one or more operating conditions of the one or more of the plurality of agents and generating a new reconfiguration instruction for at least one of the plurality of agents.

Generating the reconfiguration instruction may include identifying a desired final configuration of the plurality of agents, and the reconfiguration instruction may be an instruction to the plurality of agents to reconfigure to the desired final configuration. Changing one or more operating conditions of one or more of the plurality of agents in response to the reconfiguration instructions may include selecting, by the plurality of agents, a swarm leader; selecting, by one or more of the agents, one or more swarm followers; operating the swarm leader to move to a final position in satisfaction of at least part of the desired final configuration; and operating the swarm followers to follow the swarm leader to the final position. Changing one or more operating conditions of one or more of the plurality of agents in response to the reconfiguration instructions may include selecting, by the plurality of agents, a swarm coordinator; identifying, by the plurality of agents, one or more agents available for reconfiguration; determining, by the swarm coordinator, one or more respective final destinations for the one or more agents available for reconfiguration; determining, by the swarm coordinator, one or more respective travel paths to the respective final destinations for the one or more agents available for reconfiguration; and sending an instruction from the swarm coordinator to the one or more agents available for reconfiguration to travel on their respective travel paths. The swarm coordinator may determine a time sequence for the one or more agents available for reconfiguration to travel on their respective travel paths.

Changing the one or more operating conditions of the one or more of the plurality of agents in response to the reconfiguration instructions may include moving the one or more of the plurality of agents to a new physical location, such as by driving the one or more of the plurality of agents on the architectural surface, tumbling the one or more of the plurality of agents on the architectural surface or flying the one or more of the plurality of agents. Moving the one or more of the plurality of agents to a new physical location may include moving the one or more of the plurality of agents into a three-dimensional configuration.

Changing the one or more operating conditions of the one or more of the plurality of agents in response to the reconfiguration instructions comprises changing an intensity of light emitted from a controllable light source of the one or more of the plurality of agents.

The method also may include identifying an observed change in the one or more operating conditions of the one or more of the plurality of agents; comparing the observed change in the one or more operating conditions of the one or more of the plurality of agents to an expected change in the one or more operating conditions of the one or more of the plurality of agents; generating a modified reconfiguration instruction; and sending, via the communication network, the modified reconfiguration instruction to the plurality of agents. Identifying an observed change in the one or more operating conditions of the one or more of the plurality of agents may be done by observing the plurality of agents with a camera or a real time location system.

The method also may include identifying a respective position of each of the plurality of agents; and displaying the respective positions of each of the plurality of agents on a human user interface.

The architectural surface may be, for example, a ceiling or a wall. The holonomic operational area may have an area that is devoid, in at least some regions thereof, of features that force the plurality of robotic luminaire agents to move along a pre-defined path.

The method also may include sending, via the communication network, one or more operation signals from at least one of the plurality of robotic luminaire agents to another of the plurality of robotic luminaire agents.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations by way of example only, not by way of limitations. In the figures, like reference numerals can refer to the same or similar elements.

DETAILED DESCRIPTION

Figure 1:
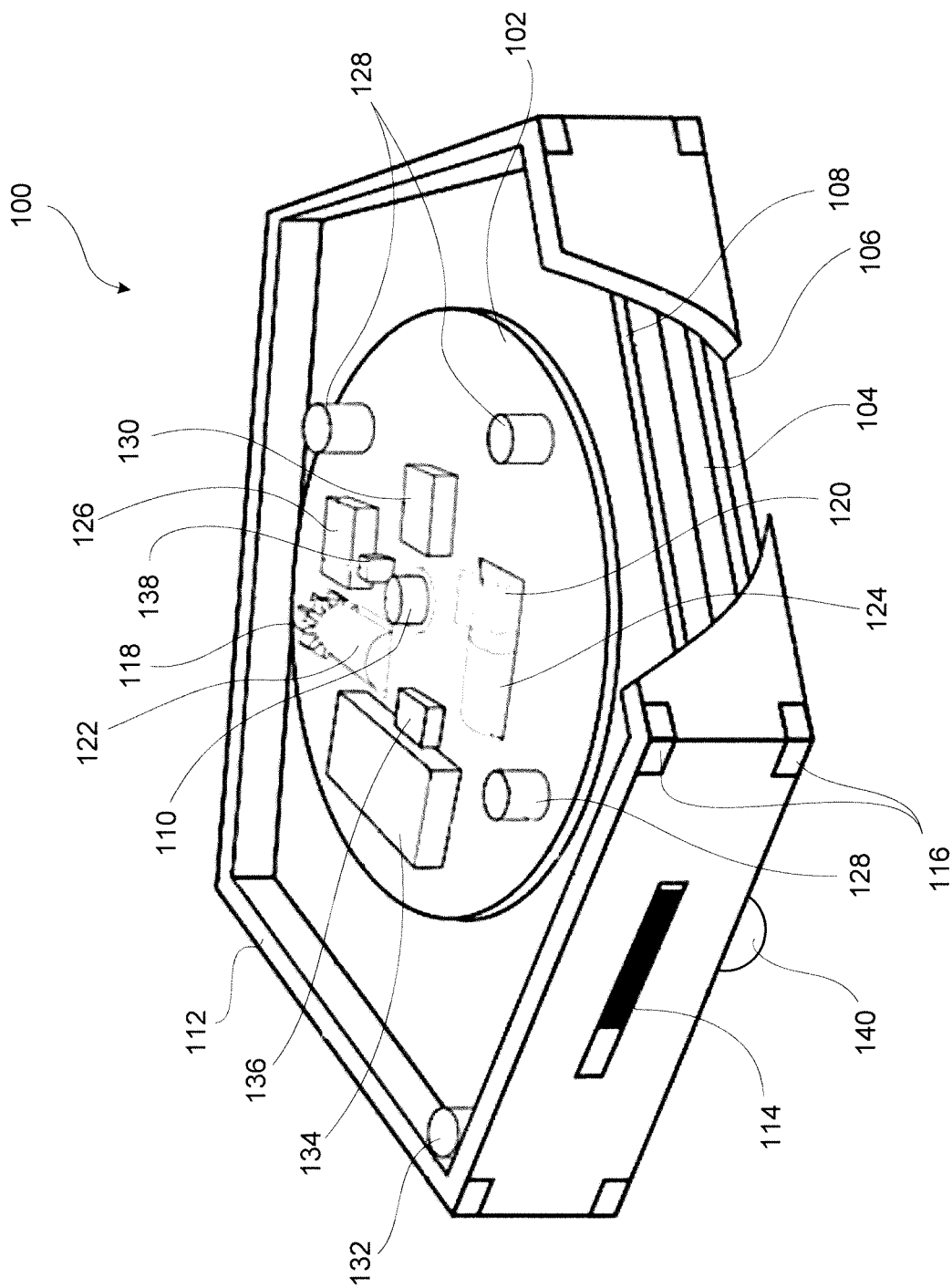
FIG. 1 is a perspective view of an example of a robotic agent.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high level, without detail, in order to avoid unnecessarily obscuring aspects of the present teachings.

Various examples are described herein in the context of a mechatronic transforming swarm of robotic agents that can assemble into various configurations on an architectural surface to provide different luminaire arrangements and lighting configurations. For lighting, the agents may carry controllable light sources and/or any of various types of sensors that detect conditions for control of lighting operations. At least some agents, however, may carry other elements instead of or in addition to controllable light sources or lighting-related sensors. The disclosed example technologies encompass structure and operation of a single robotic agent, as well as to the structure and operation of a swarm of multiple robotic agents in a collaborative manner under control of localized or distributed intelligence. The agents may be configured to adapt to the lighting requirements of the environment by moving around the environment and around themselves, assembling, disassembling and reassembling as needed. Thus, the examples may provide a modular, dynamic and customizable lighting system. Such a system may operate in lieu of or in cooperation with conventional lighting fixtures in the space or volume of operation of a robotic lighting swarm.

The individual agents may be configured structurally and/or functionally to move and interact with one another and the environment. For example, the agents may have coordinating geometric shapes, interlocking or interacting parts, and so on. Movement may be via any suitable means, such as movement on a track, wheeled movement, gravity-shift propulsion (e.g., motion caused by altering the center of gravity and/or generating momentum to cause movement), flight, and so on. When not moving, the agents may be selectively secured to a ceiling, wall or other architectural surface, either directly, or via connections to other agents.

The agents may be pre-programmed to adopt various configurations, include adaptive intelligence to address situations on an ad hoc basis, be user-programmable or user-directed, or any combination thereof. The agents may communicate with a central controller and/or one another via local communication means provided at each agent.

It will also be understood that robotic agents and systems or swarms thereof can be used to support, carry and reposition many types and combinations of effectors and sensors (collectively, "functional devices"). As used herein, an "effector" is a functional device that is configured to influence the environment surrounding the robotic agent, and a "sensor" is a device that generates a signal based on a detected state of the environment surrounding the robotic agent. Functional devices may be provided for applications including, but are not limited to: lighting, signage and displays (illuminated or not), HVAC (e.g., ceiling fans), decorations, WiFi hotspots or communication relays, location services, anchors, disability services, audio components, store guidance, UV cleaning, custodial, power distribution, air handling, security systems, video components, and so on. As such, the agents can include different mechanisms for supporting different objects and loads, as well as different mechanisms for traveling. When the apparatuses or systems are configured as a luminaire or illumination system (i.e., a system that provides lighting), it is not required for all elements or agents that form the system to provide a lighting function or to have functional devices that are configured to illuminate the environment. For example, a luminaire swarm may include various agents that lack any light sources. It will also be understood that it is not necessary for all examples to be configured as a luminaire system—that is, the swarm of agents need not include any light sources at all. For example, in some cases an agent swarm may include one or more agents having effectors in the form of speakers and one or more agents having sensors in the form of microphones, to provide a conference, presentation, announcement or communication system.

FIG. 1 illustrates a first example of a self-propelled agent 100. Agent 100 includes a movable platform 102 to which a functional device, such as a controllable light source 104, is operatively attached. The light source 104 comprises one or more sources of light, such as light emitting diodes (LEDs) having one or more colors, color-changing lights (e.g., LED lights having groups of red, blue and green LEDs that are operated in coordination to provide different colors), and/or tunable white lights (i.e., lights having an adjustable color temperature profile). LEDs are preferred for their low power consumption and light weight, but other devices may be used. Suitable light generation sources for use as the light source 104 include various conventional lamps, such as incandescent, fluorescent or halide lamps; one or more light emitting diodes LEDs of various types, such as traditional LEDs, organic LEDs (OLEDs), planar LEDs, micro LEDs, micro organic LEDs, LEDs on gallium nitride (GaN) substrates, micro nanowire or nanorod LEDs, photo pumped quantum dot (QD) LEDs, micro plasmonic LEDs, micro resonant-cavity (RC) LEDs, and micro photonic crystal LEDs; as well as other sources such as micro super luminescent Diodes (SLD) and micro laser diodes. Any of these types of LEDs may (or may not) be packaged with or coupled to photo-luminescent materials, such as phosphors, to effectively shift wavelength(s) of some of the light produced by the actual LED chips. Of course, these light generation technologies are given by way of non-limiting examples, and other suitable light generation technologies may be used to implement the light source 104.

The light source 104 may be oriented to direct the generated light in one or more directions in the proximity of the surface on which the agent 100 is located. For example, when attached to a ceiling, the light may be directed vertically down, but sideways and upwards are options, and the light may be non-directional. The agent 100 may include one or more lenses or diffusers 106 to assist with providing the desired illumination pattern and/or direction. The agent 100 also may comprise light sources incorporating variable distribution units that use electrowetting lenses to alter the beam direction and focus. The light source 104 may be connected to a light platform 108 having an integrated driver or circuitry for controlling the operation of the light source 104, but such controls may be provided remotely in other examples. Examples of other functional devices that may be used in other examples include, but are not limited to: microphones, temperature sensors, ambient light or other optical sensors, speakers, fire suppressants, air quality sensors, occupancy sensors (e.g., thermal sensors or motion sensors), security cameras, video display panels (e.g., LCD screens or the like), and so on. The agent 100 may be constructed such that the functional device is swappable, and preferably hot swappable, but this is not strictly required.

The light platform 108 also may provide a structure to interconnect the light source 104 or other functional device to the movable platform 102. In this case, the light platform 108 is mounted to the movable platform 102 by a rotatable connector. For example, the movable platform 102 and the light platform 108 may be in contact through a ring (i.e., "turntable") bearing (not shown), and a central pin may hold the platforms together. The construction of such a connection will be readily understood by persons of ordinary skill in the art, and need not be described in more detail herein.

Rotation of the light platform 108 relative to the movable platform 102 may be controlled manually by the user through direct physical manipulation of the parts, in which case a series of detents or travel stops may be provided between the light platform 108 and the movable platform 102 to resiliently hold the parts at predetermined positions or prevent possible over-rotation. Rotation of the light platform 108 relative to the movable platform 102 also may be controlled by a motor, such as a z-axis rotation motor 110 that drives a pinion to rotate a mating ring gear. The rotational connection between the movable platform 102 and the light platform 108 also may be constructed to allow the light platform 108 to rotate upon contact with other agents 100 when they come into contact with one another during reconfiguration. For example, a clutch may be provided on a pinion gear to allow the pinion gear to rotate relative to the z-axis rotation motor 110 when an adjacent agent 100 applies an external force on the agent 100.

Electrical connection between the movable platform 102 and the light platform 108 may be provided wirelessly, through wires, or through sliding ring contacts or the like, as known in the art. If wired connections are used, it may be necessary to limit rotation of the light platform 108 relative to the movable platform 102 by using travel stops or the like.

Figure 2:
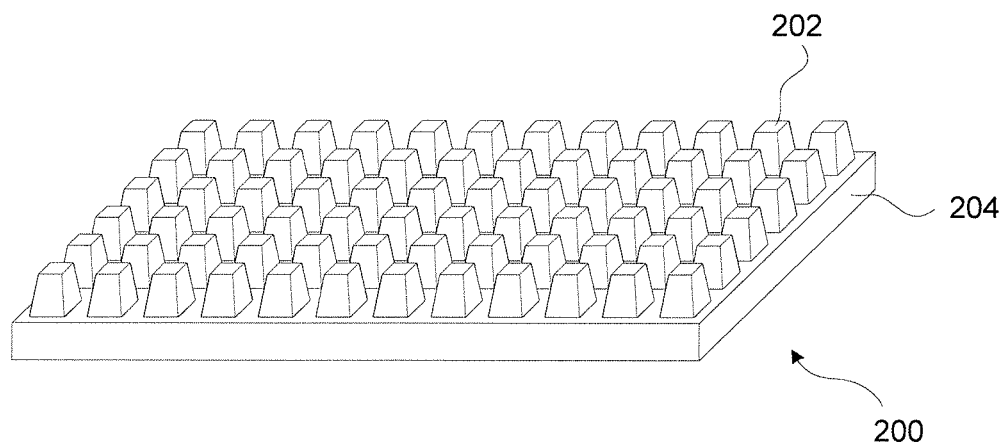
FIG. 2 is a perspective view of an example of a two-dimensional track system.

The agent 100 also has a housing 112, which may surround the various parts of the agent 100 and define an outer peripheral shape of the agent 100 in a horizontal (x-y) plane. The example of a housing 112 is connected to the light platform 108 so as to be rotatable about the movable platform 102, but it alternatively may be connected directly to the movable platform 102 or to other parts of the agent 100. For example, the housing 112 may be rotatably connected to the movable platform 102, and the light platform 108 may be rigidly connected to the housing 112. The housing 112 may have any desired profile in the x-y plane, such as circular or polygonal, and may have any desired three-dimensional shape, such as a hemispherical, cylindrical, frustoconical, or polyhedral shape. The example of a housing 112 has a pentagonal profile that extends perpendicular to the x-y plane. Alternative polygonal profiles include, but are not limited to, triangular, square, rhomboid, hexagonal, octagonal, and so on. The shape may be selected to facilitate assembly with other agents 100, such as shown in FIG. 2. The profile shape may be selected to minimize the volume or area occupied by a group of assembled agents 100 (i.e., to increase packing density), or to allow the agents 100 to gather together seamlessly. For example, triangular, square, rectangular, hexagonal and other profile shapes may be used. In other cases, different agents 100 within a single operative swarm may have different profile shapes. Other alternatives will be apparent to persons of ordinary skill in the art in view of the present disclosure.

The agent 100 may include one or more navigation elements to assist with moving the agent 100 through the environment. For example, in the example of FIG. 1, the housing 112 has a separate proximity sensor 114 located on each of its five housing faces. The proximity sensors 114 are configured to determine whether an object is located near the respective face of the housing 112. Any suitable proximity sensor may be used. Examples include infrared detectors, Hall-effect sensors, sonar sensors, radar sensors, and so on.

In some examples, the proximity sensors 114 may comprise infrared emitter and detector pairs that operate by emitting an infrared signal and detecting the signal as it is reflected off a nearby object. Such a device may operate in a binary mode by orienting the emitter and detector to have a limited field of overlapping transmission and reception, such that a received reflected signal indicates that an object is within the overlapping field and the absence of a received reflected signal indicates that the overlapping field is clear of detectable objects. The detector also may be calibrated to detect the intensity of the reflected signal to indicate a distance to a nearby object. This approach can be somewhat inaccurate due to variances in light absorption by nearby objects, but in the context of a swarm of similarly-constructed agents 100 that often are the nearby objects, such variation may be minimal. Another similar infrared emitter/detector system evaluates the distance to a reflected light signal by identifying the position of the returned signal on a linear sensor array, and correlating that position with a distance from the detector. These and other proximity sensor devices are known in the art of robotics and need not be described in more detail herein. As examples, devices such as the GP2Y0A21YK available from Sharp and the Si1102 available from Silicon Labs may be used as infrared proximity sensors.

The agent 100 also preferably includes one or more features to interact with other agents 100 to hold the agents 100 together. For example, the housing 112 may include one or more magnetic elements 116 that are positioned to interact with magnetic elements on an adjacent agent 100. As used herein, the term "magnetic element" is understood to include active magnetic materials (i.e., those permanently exhibiting properties of magnetism, such as permanent magnets), passive magnetic materials (i.e., materials such as iron that are attracted by magnetic forces but do not exhibit a significant magnetic field on their own), and dynamic magnets (devices that can be operated to either exhibit or not exhibit a magnetic field, such as electromagnets, electro-permanent magnets, and the like). The magnetic elements 116 may be located at each corner of the housing 112, or at other locations, as desired for the particular housing configuration and application. The magnetic elements 116 may be permanent magnets, electromagnets, electro-permanent magnets, and so on. Electro-permanent magnets may be preferred for this application, because they can be changed between active and inactive states by application of an electric pulse, and (unlike conventional electromagnets) do not require continuous electrical current to maintain magnetic attraction. The EPM688-V2.X OpenGrab Electro Permanent Magnet available from NicaDrone.com of Nicaragua is one example of an electro-permanent magnet that may be used, but others may be used instead. In this or other examples, the housing 112 also may include interlocking structural shapes or movable mechanical locks to engage adjacent agents 100. For example, the housing 112 may have a solenoid-operated hook that can be deployed to engage a corresponding loop or opening on the housing 112 of another agent 100, or the housing 112 may have a dry adhesive and/or electrostatic adhesive that is activated to attach to a corresponding portion of an adjacent agent 100. Other alternatives will be apparent to persons of ordinary skill in the art in view of the present disclosure.

The agent 100 includes one or more devices to enable holonomic movement in at least two dimensions. As used herein, holonomic movement describes the ability to travel to any location within a defined operating space. Such motion may be accomplished by moving directly to a new location along a straight vector path, or by combining different movements (e.g., combining separate linear movements in perpendicular x-, y- and z-directions, using one or more curved trajectories, etc.) to arrive at the final destination.

In the example shown, holonomic movement is provided or simulated by providing the agent 100 with one or more propulsion motors configured to move the agent 100 to multiple different locations on the architectural surface. For example, the agent 100 may have an x-axis propulsion motor 122 and a y-axis propulsion motor 124 to move the agent 100 along an x-axis and a y-axis, respectively. The x-axis is perpendicular to the y-axis, and the x-axis and the y-axis are both perpendicular to a z-axis. The x-axis and the y-axis are defined by the plane of the portion of the architectural surface against which the agent 100 is retained at any given time, and the z-axis is perpendicular to this plane. For purposes of explaining these examples, the x-axis and the y-axis are referred to as "horizontal axes," and the z-axis is referred to as the "vertical axis." The orientations of the horizontal and vertical axes relative to the global reference frame may vary. For example, if the portion of the architectural surface at the location of the agent 100 is horizontal with respect to the global reference frame, then the horizontal axes (x-axis and y-axis) will be in the global horizontal plane, and the z-axis will be a vertical axis that corresponds to the global gravitational direction. However, if the agent 100 is operating on a tilted surface (e.g., a curved ceiling or a wall), then the horizontal axes will be inclined relative to the global horizontal plane, and the vertical axis will be angled relative to the global gravitational direction.

The x-axis propulsion motor 122 may selectively rotate a drive element, such as a first drive gear 118 oriented to move the agent 100 along the x-axis (the x-axis gear). Similarly, the x-axis propulsion motor 124 may selectively rotate a second drive gear 120 oriented to move the agent 100 along the y-axis (the y-axis gear). Other examples may use other types of drive elements, such as wheels or the like (these and other examples are discussed in more detail below). The propulsion motors 122, 124 (as well as any z-axis rotation motor 110) may comprise DC motors, servo motors, stepper motors, or other types of motor. The various motors 122, 124, 110 preferably include integrated feedback (e.g., stepper or servo motors), but this is not strictly required. The motors 122, 124, 110 are operated by one or more motor controllers 126, as known in the art.

Referring to FIG. 2, the gears 118, 120 may be configured to engage a corresponding two-dimensional track system 200. The two-dimensional track system 200 may include, for example, a two-dimensional array of gear pins 202 that extend from a track plate 204. Each gear pin 202 has a tapered square or gear profile shape, and is dimensioned in the x-axis to fit between adjacent teeth of the x-axis gear 118, and is dimensioned in the y-axis to fit between adjacent teeth of the y-axis gear 120. Thus, for example, when the x-axis propulsion motor 122 drives the x-axis gear 118 to move the agent 100 along the x-axis (i.e., in the x-direction), the teeth of the x-axis gear 118 abut and press against the pins 202 to move the agent 100, and the teeth of the y-axis gear 120 can slide along between the pins 202. Similarly, the x-axis gear 118 slides between the pins when the y-axis gear 120 rotates to move the agent in the y-direction. The x-axis gear 118 and the y-axis gear 120 also may be operated simultaneously to move the agent 100 along a vector that lies within the x-y plane defined by the track plate 204, but that is not parallel to either the x-direction or the y-direction.

The track system 200 may define a holonomic operational area in which the agents 100 may holonomically move (via true or simulated holonomic movement). The holonomic operational area may be bounded by a perimeter wall to prevent the agents 100 from moving off the track system 200. The track system 200 also may comprise multiple holonomic operational areas, and these areas may be connected by guide paths in which holonomic movement is not possible. For example, a guide path having two closely-spaced perimeter walls may be provided between two holonomic operational areas, and these perimeter walls may prevent movement along one of the horizontal axes to force the agents 100 to drive along a predefined path between the holonomic operational areas. A holonomic operational area also may include interior boundary walls to prohibit movement to certain spaces encapsulated by the holonomic operational area (e.g., boundaries around a column that intersects the holonomic operational area). Other alternatives will be apparent to persons of ordinary skill in the art in view of the present disclosure.

The agent 100 also may include one or more encoders or other devices to provide movement control feedback by monitoring the agent's movement odometry. For example each gear 118, 120 and/or each propulsion motor 122, 124 may have an encoder wheel attached thereto, and a light-break or Hall-effect detector may be associated with each encoder wheel to monitor movement in an incremental fashion. Encoder wheels also may be located elsewhere in the drive system, such as in a transmission that operatively connects either propulsion motor 122, 124 to its respective gear 118, 120. The gears 118, 120 themselves also may be used as an encoder by locating a light-break sensor or the like to monitor the movement of the gear teeth directly.

The agent 100 also may use the track pins 202 as an encoder by monitoring the passage of pins 202 in the x-direction and y-direction. This may be done by positioning a light-break sensor or the like at the level of the pins 202, or using an optical flow-based positional sensor to detect the passage of objects adjacent the agent 100. Using the pins 202 as an encoder (or tracking the underlying surface using other means) has the added benefit of confirming that movement of the gears 118, 120 is being properly translated into movement along the track system 200. In contrast, an encoder on a gear 118, 120 or propulsion motor 122, 124 may falsely register movement when the gear 118, 120 rotates while it is out of engagement with the track system 200 (i.e., slipping). Thus, using the pins 202 as an encoder eliminates slippage from the odometry measurement and a mismatch between the propulsion motor drive control signal and movement output can be used to detect a derailment or other error condition.

Other movement devices may be used in other examples. For example, the x-axis gear 118 and y-axis gear 120 and their respective propulsion motors 122, 124 may be replaced by a drive element in the form of a single steerable drive wheel or multiple fixed or steerable drive wheels or tracks, as commonly used in the art of floor-operated robotics. Other examples may use omnidirectional wheels to provide vectored thrust without a movable steering element (e.g., a rectangular or triangular arrangement of four or three omni-directional wheels). While such drive element devices offer flexible mobility, they may lack the inherent benefits of reduced slippage and odometry tracking that a track-based system uses. Nevertheless, such devices may be used.

Figure 3:
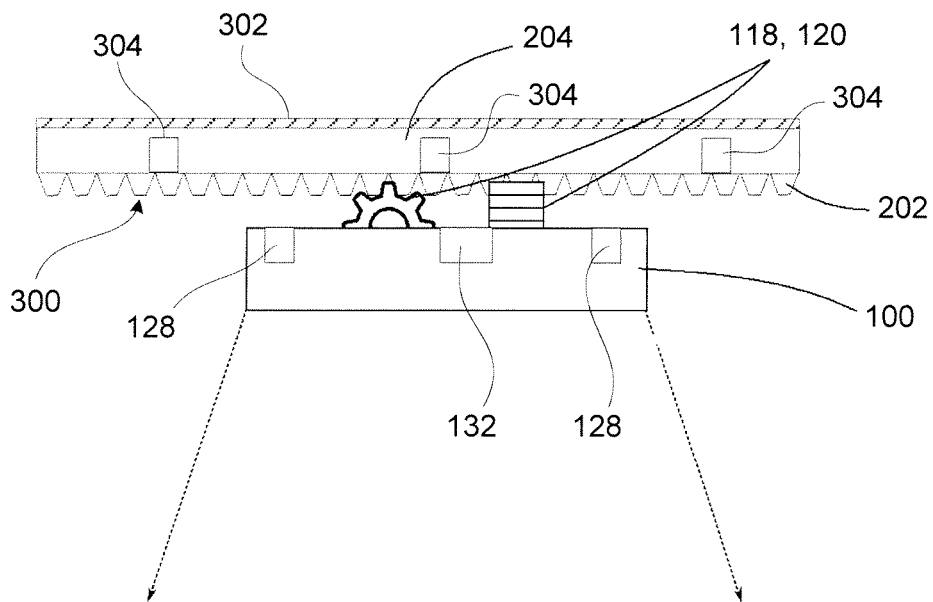
FIG. 3 is a schematic side elevation view of an example of a robotic agent.

Referring now to FIGS. 1 and 3, The agent 100 may be maintained in position against a drive surface 300 by a suspension having one or more suspension members 128. The drive surface 300 preferably comprises a generally horizontal ceiling of a room, but it may instead comprise a vertical wall or the like. The drive surface 300 may be bounded by a perimeter boundary. The perimeter boundary may comprise solid obstructions or markers that are perceivable by the agents 100 (or a feedback system) to designate prohibited movement areas. For example, the drive surface 300 may have a physical perimeter boundary formed by a wall that protrudes from the surface, or a virtual perimeter wall formed by a light beam (i.e., a "light fence"), magnetic strip or a wire carrying a predetermined current signal. As another example, the perimeter boundary may comprise a strip of material (e.g. reflective or colored tape) that is detectable by a feedback device, such as a camera that views the drive surface, and the feedback device may track the movement of the agents 100 relative to the strip of material and provide feedback instructions to prevent the agents 100 from crossing the strip. A virtual wall may be detected by an existing sensor (e.g., proximity sensor 114) or a dedicated sensor on the agent 100 (e.g., a magnetic field sensor or the like). Such barriers are known in the art of robotics, and need no further description herein.

In this example, the drive surface 300 comprises a two-dimensional track system 200 such as shown in FIG. 2. The drive surface 300 and the suspension members 128 are selected to provide a force that holds the agent 100 against the drive surface 300. This force may be created, for example, by integrating one or more first magnetic elements into the suspension members 128 and integrating one more second magnetic elements into the drive surface 300 to provide a magnetic force between the first and second magnetic elements. For example, the two-dimensional track system 200 may be made of ferrous metal, or a ferromagnetic layer 302 (e.g., an iron grid or sheet) may be located at or near the interface between the drive surface 300 and the agent 100, and the suspension members 128 may comprise permanent magnets, electromagnets, or electro-permanent magnets. In another example, the drive surface 300 and the suspension members 128 comprise cooperating magnets. In still another example, the suspension members 128 may comprise ferromagnetic materials, and the drive surface may comprise one or more embedded magnetic elements that pull on the ferromagnetic suspension members 128. In the latter case, the magnetic elements in the drive surface 300 may comprise actively-controlled electromagnets or electro-permanent magnets that apply a modulated force to hold the agent 100 at a particular position on the drive surface. An array of active magnets in the drive surface 300 also may be used to move the agent 100 across the drive surface 300, in which case the agent 100 may not require its own internal drive system. An array of active magnets also may be operable to hold the agent 100 at a location that is spaced a short distance from the drive surface to levitate in the air. Such an active magnet array also may be functional to provide inductive power to the agent 100, and to transmit data to the agent 100.

One or more of the suspension members 128 also may comprise a hook or other structure (not shown) that can engage corresponding tracks or openings in the drive surface to provide a backup in case a magnetic suspension member 128 fails (e.g., if a power outage interrupts an active magnet system). It is also envisioned that one or more of the suspension members 128 may be an electro-permanent magnet that is activated whenever the agent 100 stops at an operating position to hold the agent 100 at that position with little or no power output requirement. The suspension members 128 also may include wheels, roller balls, casters, low-friction bearing materials, or other mechanisms to provide a low-friction contact point between the agent 100 and the drive surface. Other alternatives will be apparent to persons of ordinary skill in the art in view of the present disclosure.

The agent 100 may include a local computer processing unit ("CPU") 130 that operates to control the motor controller 126 to move the agent 100 through the environment. The CPU 130 also may be operatively connected to the proximity sensors 114 and other operative parts of the device. Details of the electronics and control system are provided below.

The agent 100 may be powered by wireless power, batteries, capacitors, and/or other portable energy storage systems. For example, the agent 100 may include an inductive coil wireless power receiver 132, and the ceiling or other surface may include one or more inductive coil wireless power transmitters 304 (see FIG. 3). The power transmitters 304 may be placed at predetermined locations where the agent 100 can go to charge a local battery 134 (e.g., a lithium-ion battery or the like) to provide power when the agent 100 is not near a power transmitter 304. A power management system 136 may be provided to control battery charging and distribution of power to the agent's 100 electrical systems.

The power transmitter or transmitters 304 may include local homing beacons (e.g., optical or radio transmitters operating at a certain frequency, or the like), or characteristic features (e.g., a particular infrared reflective pattern), to allow the agents 100 to find them. The power transmitter or transmitters 304 also may be located at one or more predetermined locations on a stored map to allow guidance of the agents 100 to those locations for charging. The power transmitters 304 also may be located throughout the environment at intervals that are selected such that the agent 100 can continuously detect their presence through current sensing at the wireless power receiver 132. Other alternatives will be apparent to persons of ordinary skill in the art in view of the present disclosure.

In other examples, the agents 100 may have wired charging terminals that can mate with power charging terminals located at one or more fixed locations within the environment. For example, electric terminals may be provided on an upper surface of the movable platform 102 or housing 112 to selectively connect to corresponding terminals at one or more charging stations distributed throughout the environment to provide wired energy to charge a battery 134. It is also envisioned that a wired connection can be maintained between the agent 100 and an external power supply by using sliding contacts that contact live power tracks embedded in the drive surface or otherwise located throughout the environment. The agents 100 also may be manually recharged, such as by including a visible or audible signal to alert a human operator to replace the agent's battery 134 or to plug the agent 100 into a charging terminal to recharge the battery 134.

The agent 100 also may include various additional sensors to observe the operation of the agent 100 and the surrounding environment. For example, each agent 100 may include an inertial measurement unit ("IMU") 138, such as a 9-axis accelerometer to detect movement in three planes and rotation in three axes. The IMU 138 may be operatively connected to the CPU 130, and used, for example, to provide feedback to compare movement commands issued to the drive system with output measurements of actual movement. This can be used to account for sensor drift or mechanical slippage, and to otherwise help track the location and operation of the agent 100 using "dead reckoning" techniques. Where movement is restricted to a single plane, a less comprehensive accelerometer may be used to detect movement along the two expected movement axes (x and y) and rotation about the one expected rotation axis (z). Suitable accelerometers may include, for example, the LSM9DS1 9-axis IMU module available from STMicroelectronics of Geneva, Switzerland.

The agent 100 also may have an optical sensor 140 to evaluate the lighting conditions around the agent 100. The optical sensor 140 may be a simple photocell that detects light intensity, which can be useful to detect the light intensity at or near the agent 100. Such a device may be collimated or provided with a lens to focus the field of view of the optical sensor 140 at a particular region of space (e.g., immediately below the agent 100). The optical sensor 140 also may be a more complex device, such as a digital camera (i.e., a two-dimensional photocell array with an associated lens system). The agent 100 also may have movement feedback sensors (e.g., wheel encoders and the like), and other sensors such as bumpers to detect contact with obstacles or other agents 100, air quality sensors, audio sensors (microphones), movement sensors, thermal sensors, and so on.

Figure 4:
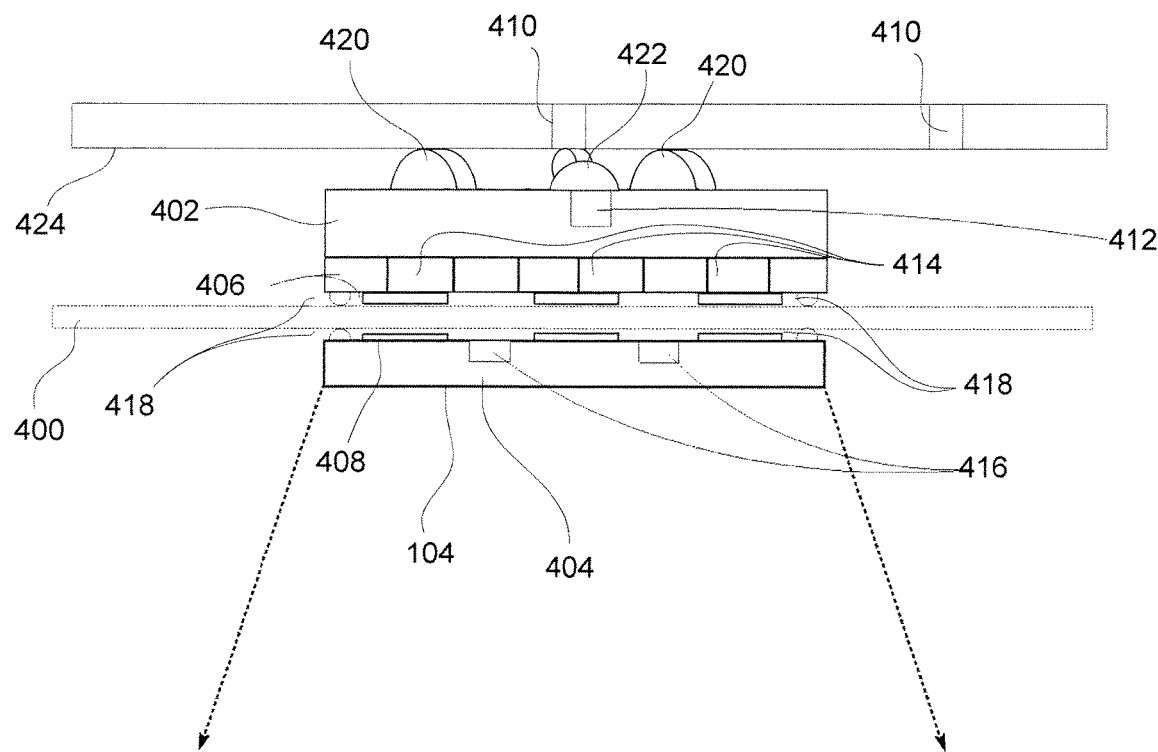
FIG. 4 is a schematic side elevation view of another example of a robotic agent.

Referring to the example shown in FIG. 4, in some examples, an agent 100 may comprise multiple operative components that are physically spaced from one another. For example, an agent 100 may have components located on different sides of a ceiling façade 400. The façade 400 may comprise a panel of rigid material, a suspended sheet of flexible material (e.g., a thin polymeric film), and so on. In this case, the agent 100 comprises a first housing component 402 located above the façade 400, and a second housing component 404 located below the façade 400. The various operative parts of the agent 100, such as those described above with respect to the example of FIG. 1, may be distributed between the first housing component 402 and the second housing component 404. For example, the first housing component 402 may include wheels 420 and a swivel caster 422 that engage the drive surface 424, a CPU, battery, suspension members, and so on, and the second housing component 404 may include a light source 104 and associated drive circuitry.

In this example, the drive system may differ from the previously-illustrated examples, such as by replacing the drive gears with one or more round wheels 420 or one or more swivel casters 422 that contact a smooth ceiling surface 422. One or more of the wheels 420 and casters 422 may have a propulsion motor to propel the agent 100 across the ceiling surface 422. For example, two wheels 420 may be aligned to rotate about a common rotation axis (i.e., they have collinear rotation axes), and provided with independently-operated propulsion motors to rotate and drive the agent 100 holonomically across the drive surface 422, as known in the art of ground-based robotics and need not be described in detail herein. As another example, a single caster 422 may be provided with a propulsion motor to rotate the caster wheel, and a swivel motor to rotate the entire caster about the vertical axis, to thereby provide the ability to drive the agent 100 in any desired direction. Such configurations are also known in the art of ground-based robotics and need not be described in detail herein. As before, suspension members (not shown) hold the agent 100 against the surface 422 during operation.

The second housing component 404 may be maintained in proper alignment with the first housing component 402 using magnetic elements in the same manner as described above in relation to the suspension members 128. For example, the first housing component 402 may comprise one or more upper magnet elements 406 and the second housing component 404 may comprise one or more lower magnet elements 408 that are positioned to face the upper magnet elements 406. The magnet elements 406, 408 may comprise permanent magnets, electro-permanent magnets, electromagnets, ferrous materials, and so on. For example, the upper magnet element 406 may comprise an array of three or more electro-permanent magnets, and the lower magnet element 408 may comprise a corresponding array of three or more ferrous metal plates. The opposite arrangement and any variations of magnet devices are also contemplated for use in other examples.

The agent 100 may be powered by one or more first-stage wireless power transmitters 410 that send power to first-stage wireless power receivers 412 in the first housing component 402, such as described above. Similarly, the first housing component 402 may have one or more second-stage wireless power transmitters 414 that send power to second-stage wireless power receivers 416 in the second housing component 404. In another example, the second housing component 404 may receive power directly from the first-stage wireless power transmitters 410 in the drive surface 300, or it may be battery-operated. Other alternatives will be apparent to persons of ordinary skill in the art in view of the present disclosure.

The first housing component 402 and the second housing component 404 also may include features to facilitate movement relative to the façade 400. For example, the first housing component 402 and the second housing component 404 may have respective casters 418 facing the façade 400. The casters 418 provide rolling contact points with the façade 400 to provide a low-friction interface. This reduces the power requirements for moving the agent 100 relative to the façade 400, and reduces the likelihood of the second housing component 404 becoming separated from the first housing component 402. In some examples, an additional layer of transparent material may be suspended below the second housing component 404 to prevent it from falling if it does lose contact with its respective first housing component 402. For example, a sheet of transparent film can be suspended below the second housing component 404.

Agents 100 such as those shown in FIG. 4 also may be used in conjunction with other agents that do not include the second housing component 404. For example, agents that operate as communication relays, or other devices that do not need access below the façade to operate (e.g., infrared heat or movement sensors operating through an infrared-transparent façade), may be fully functional with only the first housing component 402 located above the façade, in which case the second housing component 404 is not necessary and may be omitted.

Figure 5:
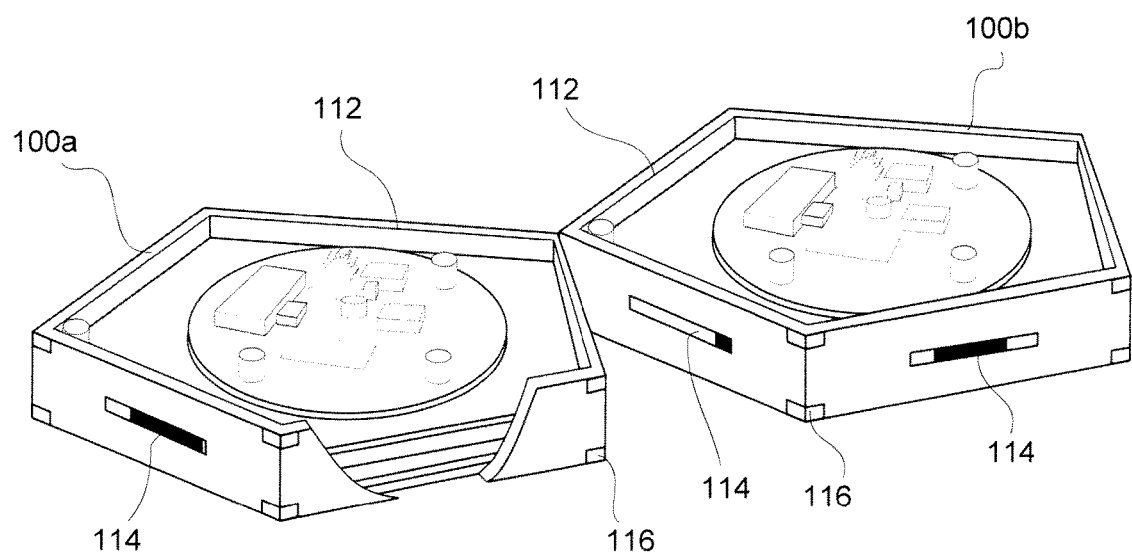
FIG. 5 is a perspective view of two agents of FIG. 1 in the process of assembling into an example of a selectable configuration.

FIG. 5 illustrates how two agents 100a and 100b can engage one another during use. In this example, the agents 100a, 100b each comprise an agent 100 as described in relation to FIG. 1, but the agents 100a, 100b may be different in various respects. For example, the agents 100a, 100b may have different geometrical shapes (e.g., one with a pentagonal housing 112 and the other with a square housing 112), or they may be equipped with different operative equipment (e.g., one with a light source 104 and the other with an audio speaker), and so on. In use, the agents 100a, 100b are separately driven by their own respective propulsion motors, to a location where they can encounter one another. When they approach one another, the agents 100a, 100b may establish two-way communications between one another using, for example, infrared signals transmitted via their respective infrared emitter/receiver 114 or by other devices such as described elsewhere herein. The communications may be used to uniquely identify each agent 100a, 100b to the other, to transmit or relay commands sent by an orchestration controller such as described below, to coordinate movements to dock together, and so on. For example, the agents 100a, 100b may communicate their relative rotational orientation to one another, and use this information to drive a z-axis rotation motor 110 on one or both of the agents 100a, 100b to bring flat faces of their housings 112 into a parallel alignment to allow magnetic elements 116 at the corners of housing faces engage one another.

As noted above, the agents 100 may be operated on any architectural surface, such as a ceiling or a wall. The surface may be curved or flat. If the surface is curved, the suspension 128 may comprise a configuration that naturally complies to surface undulations (e.g., a triangular arrangement to provide three points of support). The suspension also may include compliance mechanisms, such as springs to allow the suspension to conform to variations in the surface. The architectural surface (e.g., drive surface 300) preferably comprises a holonomic operational area in which the agents 100 may holonomically move (via true or simulated holonomic movement). A holonomic operational area may comprise a two-dimensional track system 200, such as described above, or it may comprise a conventional architectural surface such as a smooth ceiling or wall that has sufficient size to allow the agents 100 to move throughout the surface in a holonomic manner. To this end, the architectural surface preferably is devoid, at least one some regions thereof, of travel-controlling features that force the agents 100 to travel along pre-defined paths (e.g., narrow passages between boundary walls or tracks), although such travel-controlling features may be provided to span distances between holonomic operational areas. Also as noted above, boundary walls may be used to define the outer boundary of the holonomic operational area.

Figure 6:
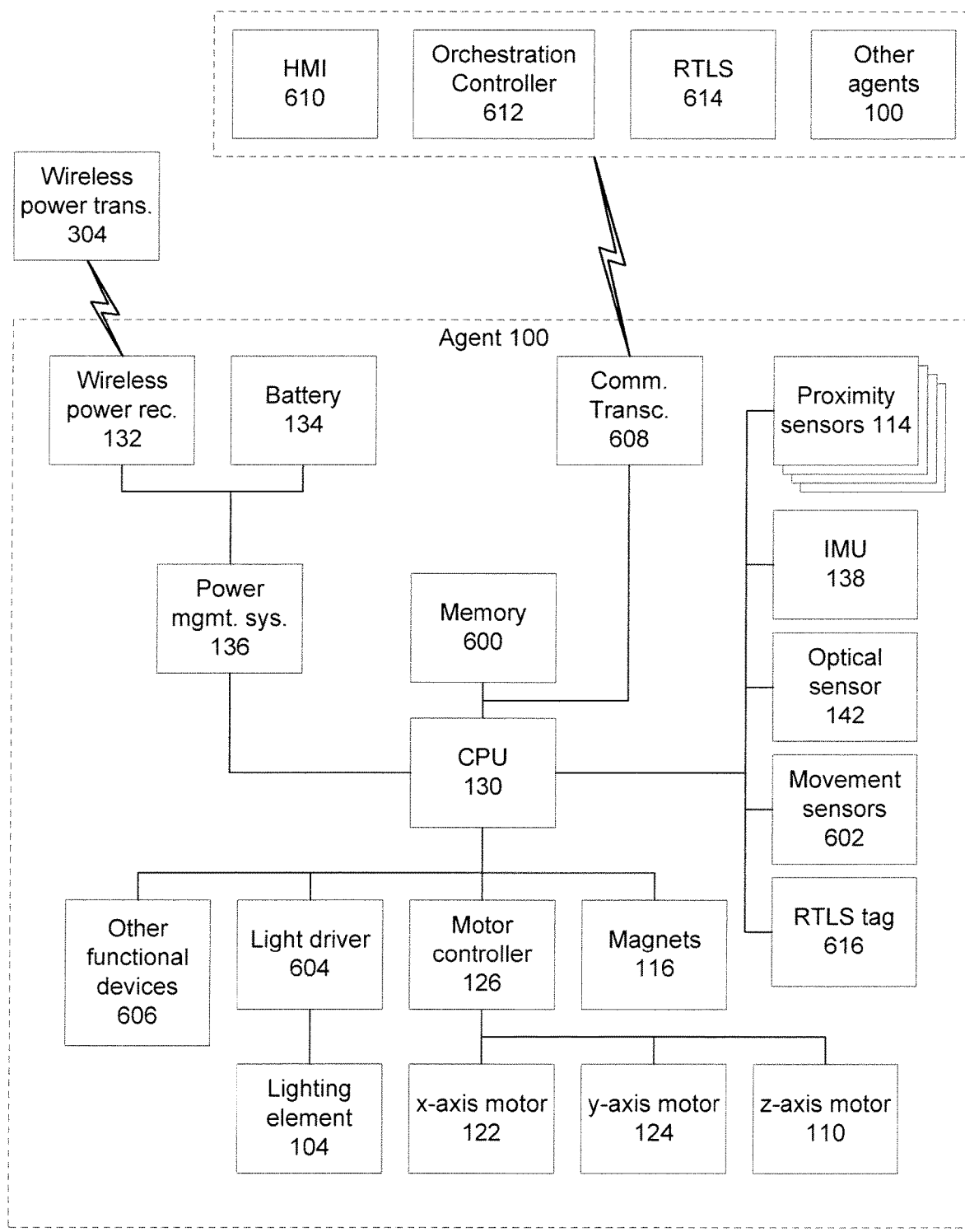
FIG. 6 is a high-level functional block diagram of elements of an example of a robotic agent and of related devices that may communicate with the robotic agent.

FIG. 6 schematically illustrates an example of an electronics package that may be used in an agent 100, along with additional control and communication systems that may be associated with an agent 100. As noted above, the agent 100 includes a CPU 130 that controls local operation of the agent 100. The CPU 130 may include a processor, one or more digital storage media, data and programming in the storage and appropriate input/output circuitry. For example, the CPU 130 may have a Micro-Control Unit ("MCU") that implements control logic for operating the light source 104, z-axis rotation motor 110, propulsion motors 122, 124, and other operative aspects of the agent 100, based on executable programming stored in an accessible memory 600 that is integral to the MCU. The CPU 130 may comprise any hardware elements structured and arranged to perform the processing functions, such as purpose-built logic components, a programmable device such as a microprocessor or a microcontroller, integrated circuits, or any combination of circuitry of these or other suitable devices. The CPU 130 preferably is configured as a "system on a chip" having a local memory 600 for storing commands, control information, configuration settings, operation data logs, and the like. The CPU 130 also may include or be connected to power and data busses (not shown), various input and output ("I/O") interfaces, and other conventional computing devices. The CPU 130 and memory 600 may comprise individual respective units, or they may be combined into a single operative unit. The CPU 130 and memory 600 also may comprise a distributed collection of devices that work in coordination to control the agent's operation. The CPU 130 and memory 600 also may be located remotely from the agent 100, with input and output thereto being transmitted wirelessly. The memory 600 may comprise any suitable digital memory device or devices, such as read-only memory, random access memory, flash memory, micromagnetic storage disk devices, and so on. Details of such CPU systems and programming are known in the field of programmable electronic devices, and the specific details of the CPU 130 and memory 600 will be understood by persons of ordinary skill in the art without further explanation thereof.

The CPU 130 executes operation programs that are hardwired or stored in memory 600 to receive data input from sensors and external controllers, and to issue instructions to drive various functional devices associated with the agent 100. The CPU 130 also works with the power management system 136 (which may be integral with the CPU 130 or provided as a separate device) to control distribution of power to the various associated devices and sensors.

In the shown example, the CPU 130 receives local input from the proximity sensors 114, the IMU 138, the optical sensor 140, movement feedback sensors 602 (e.g., motor encoders and the like), and other sensors as may be desired in particular applications. Based on this and other input, the CPU 130 issues instructions to the motor controller 126 and functional devices such as the light source 104, as explained in more detail below. Communication with the light source 104 may be direct, or through a light driver 604 having control circuits specific to the light source 104, as known in the art. In examples that use electromagnets or electropermanent magnets, the CPU 130 may be operatively connected to the magnetic elements 116 to activate them at the appropriate time to engage other agents 100 or other environmental features such as docking stations. The CPU 130 also may issue commands to any active suspension members 128 that might be provided with the agent 100, or other functional devices 606 such as a movable hook or other mechanical lock to engage the ceiling when the agent 100 reaches an operation destination.

The CPU 130 also may receive input from one or more wireless communication systems, such as communication transceivers 608 that are configured to communicate with other agents 100 and/or other devices. Although shown separately, the communication transceiver 608 may be implemented in circuitry on the same chis as the CPU 130. Also, multiple communication transceivers 608 may be provided, for example, to support additional communication protocols and/or provide communication over different communication media or channels. A suitable communication transceiver 608 may comprise, for example, a multichannel embedded wireless serial transceiver module operating according to communication protocols such as wireless Ethernet ("WiFi"), Zigbee, Zwave, Bluetooth, X10, or the like. Suitable devices may include the CC1000 Chipcon transceiver from Texas Instruments of Dallas Tex. and the ZL70250 Sub-GHz transceiver from Microsemi of Aliso Viejo, Calif. The communication transceiver 608 also may comprise a near-field communication ("NFC") device (e.g., the NTAG212 available from NXP Semiconductors of Eindhoven, Netherlands), an audio (e.g., ultrasonic) communication device, an optical transceiver, and so on. The communication transceiver 608 may be a wireless communication device to facilitate autonomous movement of the agent 100. However, it is also envisioned that the agent 100 may include a wired communication path that is created with other agents 100 via electric contacts that engage when the agents 100 dock with one another. Wired communication nodes comprising wired communication lines also may be provided within the environment for the agents 100 to selectively dock with. Also, the environment may include wired communication tracks or the like through which the agents 100 can maintain constant wired communication with a network.

The communication transceivers 608, as well as the other wireless communication devices described herein, may provide communication with other control or processing equipment using any variety of communication technologies. For example, the communication transceivers 608 may communicate with remote hosts, user computers or other interface devices, servers or gateways of a building control and automation system, and so on. The communication transceivers 608 may have circuitry configured to communicate over any available medium, such as free-space optical link (e.g., infrared light transmissions), radio frequency (RF) link, and so on.

The wireless communication system may comprise a true transceiver (i.e., a single operative device that sends and receives signals), or any combination of transmitting and receiving devices that operate together to send and receive signals. For example, one form of wireless communication system may be provided by operating the emitter portion of an infrared emitter/detector type proximity sensor 114 as a data transmitter, and operating the detector portion of the proximity sensor 114 as a data receiver. This may be done, for example, by multiplexing communication signals over the existing proximity-detecting signals that are used to locate nearby objects. Signals received at the infrared receiver can be demultiplexed to differentiate proximity signals reflected from nearby objects from communications signals emitted by nearby agents 100 or other devices. Thus, the proximity sensors 114 may be operated essentially simultaneously as communication transceivers 608.

In another example, a wireless communication system between the agents 100 may be provided by providing each agent 100 with a dedicated infrared transceiver arrangement. For example, each agent 100 may have a 360-degree infrared transmitter and a 360-degree infrared receiver. The 360-degree transmitter may comprise an unshielded infrared LED on a lower surface of the agent 100 that emits infrared radiation in a 360-degree range around the agent in the x-y plane. The 360-degree infrared receiver may comprise a so-called "omnidirectional" lens that receives infrared radiation signals in 360-degree range around the agent 100 in the x-y plane.

In another example, the wireless communication system may comprise a combination of disparate communication devices. For example, the agent 100 may have a receiver in the form of an inductive coil sensor that detects instruction signals provided by a network of wires embedded in the drive surface 600. In this example, the agent 100 may have a transmitter in the form of an infrared LED light that emits a signal to be observed by a local camera system connected to a processor that collects data transmitted by the agents 100. Other alternatives will be apparent to persons of ordinary skill in the art in view of the present disclosure.

In still other examples, the communication transceiver 608 may be replaced by a purely passive communication receiver, and the agent 100 may not be able to transmit signals. For example, the agents 100 in a swarm may be configured to receive movement and other operation instructions from an external source that tracks the movement of the agents 100. In such cases there may be no need or desire to receive feedback from the agents 100 or have the agents 100 communicate with one another, and a passive communication receiver may be used.

The agent 100 preferably is configured to receive instructions remotely from one or more external sources, such as a human machine interface ("HMI") 610, an orchestration controller 612, or other agents 100 within the swarm. A feedback system may be provided to ensure proper execution of those instructions. For example, a real-time location system ("RTLS") 614 also may be provided to detect and track a RTLS tag 616 in the agent 100, such as described below. Instructions to the agents 100 may be funneled through one or more specific system components. For example, in one example, the orchestration controller 612 is solely responsible for communicating directly with the agent 100 through the communication transceiver 608, and the remaining external sources issue instructions or send data to the orchestration controller 612 to be conveyed to the agent 100. Alternatively, one or more of the external sources may communicate in parallel with the agent 100. For example, the orchestration controller 612 may convey information from the HMI 610 and the RTLS 614 to the agent 100 via the communication transceiver 608, but the other agents 100 may communicate directly with the agent 100 via the proximity sensors 114 acting as communication transceivers. As another example, the HMI 610, orchestration controller 612, RTLS 614 and agents 100 all may communicate directly with each other. Other configurations are also possible, and other alternatives will be apparent to persons of ordinary skill in the art in view of the present disclosure.

Figure 7:
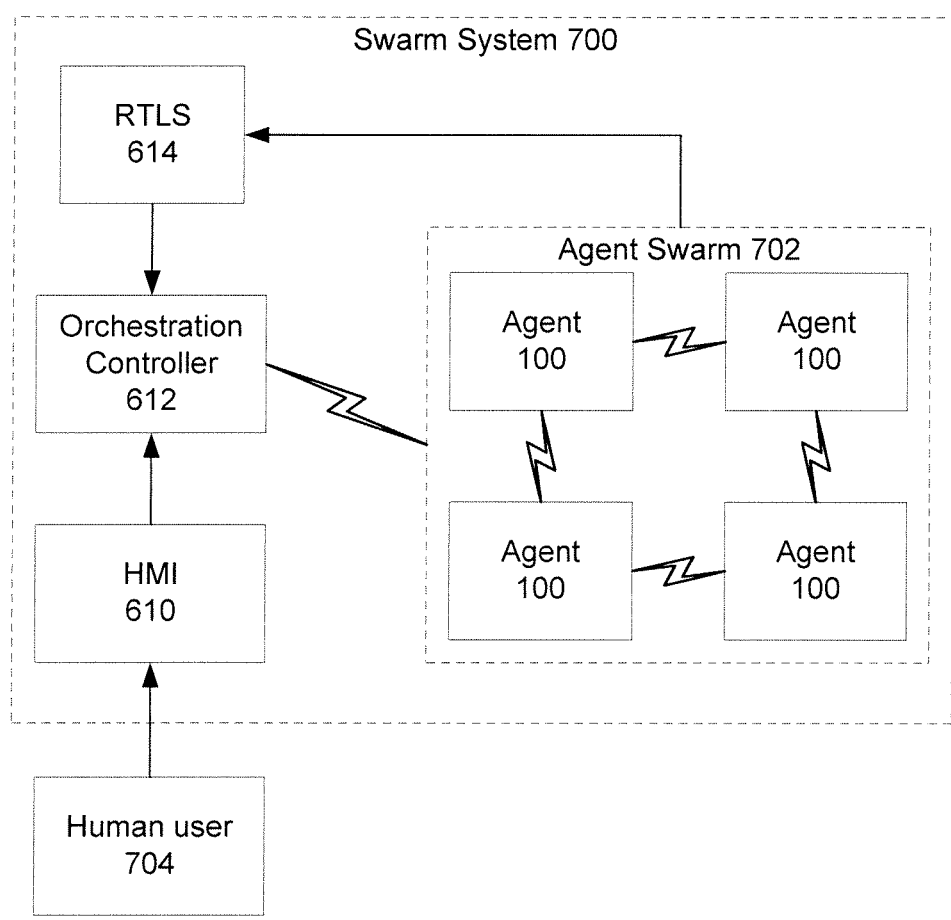
FIG. 7 is a schematic diagram of an example of an agent swarm.

FIG. 7 illustrates an example of a robotic agent swarm system 700 for operating a swarm 702 of agents 100. In this example, the orchestration controller 612 is primarily responsible for communicating commands to the agent swarm 702. In general terms, the orchestration controller 612 instructs the agents 100 on where to go and how to operate. The orchestration controller 612 may operate automatically, under direct user control, or according to any variety or combination of algorithms. For example, the orchestration controller may have an automatic program for assembling into a morning lighting configuration at a particular time every day, and a human user 704 may override this configuration upon entering a command to the HMI 610.

The HMI 610 may comprise any suitable interface for conveying user instructions to the agents 100. Examples include a wall-mounted controller, a mobile device (e.g., a smartphone or tablet), a computer terminal, or the like. The HMI 610 may include one or more of a touchscreen interface, a keyboard interface, a gesture sensor (e.g., the APDS- 9960 gesture sensor from Broadcom Limited of San Jose, Calif.), a computer vision system that tracks user movements, an audio sensor (microphone) to receive oral commands, and so on. The HMI 610 may include one or more wired or wireless connections to the orchestration controller 612, or the HMI 610 may be integral with the orchestration controller 612. In one example, the HMI 610 comprises an application operating on a mobile device that is connected to the orchestration controller 612 via a local computing network that is connected to both the HMI 610 and the orchestration controller 612. Alternatively, an HMI 610 in the form of a mobile device may connect directly to the orchestration controller 612 via Bluetooth or other direct wireless communications. Multiple HMIs 610 also may be used, and the HMI 610 may have user-specific configurations to allow some users to have more control over the agent swarm 702 than others (e.g., super-users with privileges to create new predetermined agent configurations, and regular users who can only select from those predetermined agent configurations).

The HMI 610 preferably is operative to instruct the orchestration controller 612 to manipulate the agents 100, and to receive operation feedback from the orchestration controller 612. For example, the orchestration controller 612 may send position status information to the HMI 610 to track all of the agents 100 in real time, or other information such as error status reports, operation logs, and so on.

Figure 8:
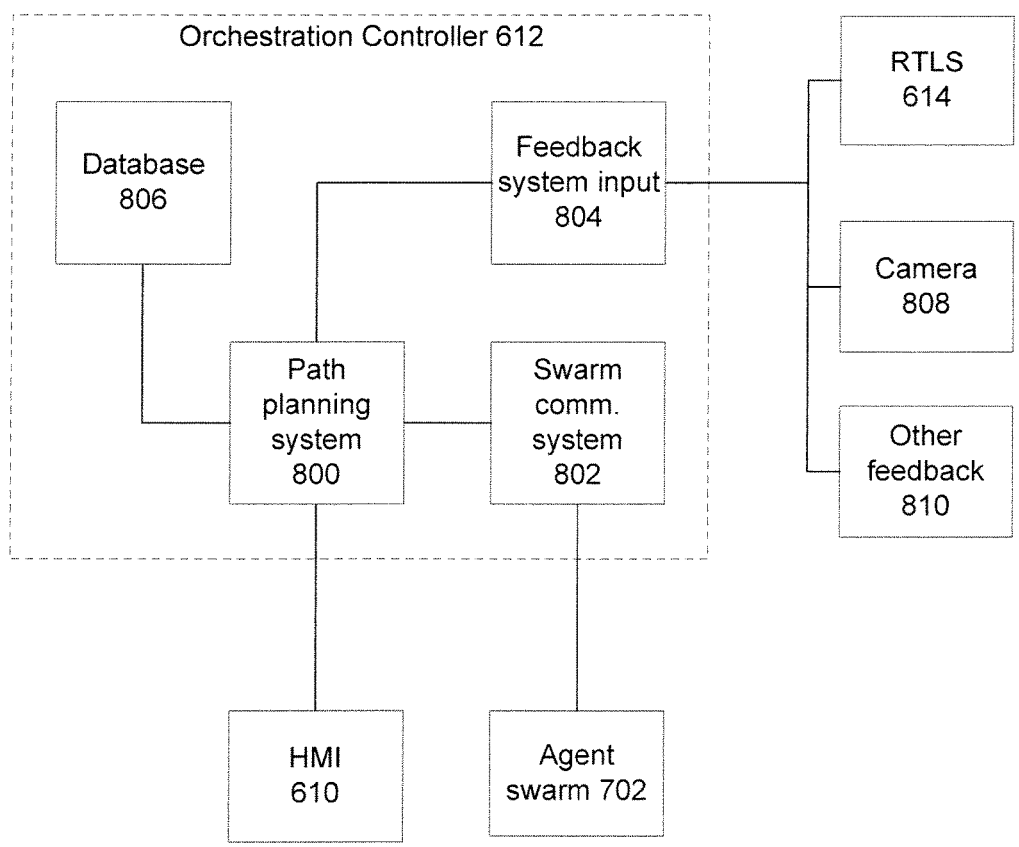
FIG. 8 is a high-level functional block diagram of an example of an orchestration controller and related devices.

FIG. 8 illustrates one example of an orchestration controller 612. The orchestration controller 612 may comprise any suitable combination of hardware and software. For example, the orchestration controller 612 may comprise a computer processor and associated memory that are connected to a wireless communication system that is configured to communicate with the agents 100.

The orchestration controller 612 may be provided in the form of a fixture that is located in the environment in proximity to the agent swarm 702, or it may be a remote device, such as a computer operating remotely from the agent swarm 702. The orchestration controller 612 also may be configured as one of the agents 100 within the agent swarm 702. For example, each agent 100 may comprise sufficient processing equipment, memory and communications devices to act as the orchestration controller 612 at any given time, or individual agents 100 may be specially equipped with this capability. The orchestration controller 612 also may be integral with a HMI 610. For example, the HMI 610 may comprise a smartphone or tablet device having sufficient processing equipment, memory and communication devices to communicate (e.g., directly or via a connection to a common wireless network) with the agent swarm 702 and any feedback or tracking devices that might be used with the system. Similarly, the RTLS 614 may be integrated into one of the agents 100 within the agent swarm 702. As another example, the HMI 610, orchestration controller 612 and RTLS 614 may all be integrated into one or more agents 100 within the agent swarm 702, in which case the robotic agent swarm system 700 is self-contained within the agent swarm 702. Other alternatives will be apparent to persons of ordinary skill in the art in view of the present disclosure.

The orchestration controller 612 may include various modules for planning and executing control of the agent swarm 702. For example, the orchestration controller 612 may include a path planning system 800, a swarm communication system 802, and a feedback system input 804. The path planning system 800 is responsible for instructing the agent swarm 702 how to move to the next desired configuration. The orchestration controller 612 may include a number of different triggers for moving the agent swarm 702. These triggers may include, for example, scheduled reconfiguration triggers, automated reflexive reconfiguration triggers, and manual reconfiguration instructions. Instructions for such triggering events may be stored in a database 806 that the path planning system 800 queries periodically to determine whether it is necessary to reconfigured the agent swarm 702, or triggering events may be initiated by instructions from the HMI 610 or by feedback from the feedback system input 804. Other control system architectures (e.g., processing schedules, control hierarchies, finite state machine operations, behavior control/neural networks, and so on) may be used in other examples, and particular details of the control system architecture are given only by way of non-limiting example.

Examples of scheduled reconfiguration triggers include, but are not limited to: a morning lighting arrangement to be adopted at a first predetermined time of day, an afternoon lighting arrangement to be adopted at a second predetermined time of day, and an evening lighting arrangement to be adopted at a third predetermined time of day. An example of an automated reflexive reconfiguration event is an instruction to equalize the light intensity distribution within a room in response to light detectors (e.g., the agents' optical sensors 140) determining that part of the room has become relatively dark or relatively bright, such as might happen when strong daylight comes through a window to brighten a nearby part of a room. This type of instruction passes information about the room conditions to the path planning system 800 via the feedback system input 804, and upon receiving this information the path planning system 800 may send instructions to the agent swarm 702 to equalize the light intensity throughout the room as best as possible. Other automated reflexive reconfiguration events could be, for example, instructions to dim or shut off light sources 104 if no sounds, movement or body heat signatures are detected in a room for a predetermined time, turn on or brighten light sources 104 when sound, movement or body heat signatures are detected, and so on. Still another automated reflexive reconfiguration event may be to automatically change to a certain mode, such as presentation mode, upon determining by communication with a personal scheduling program (e.g., Microsoft Outlook), that the room is scheduled for a presentation event.

Any variety of manual reconfiguration instructions also may be incorporated into the path planning system 800. Such manual reconfiguration instructions may be input through the HMI 610, such as by receiving a human user's instruction through the HMI 610 to turn the lights on or off, or move the lights to a particular location. The feedback system input 804 also may be effectively incorporated as an agent of the HMI 610 to facilitate manual reconfiguration instructions without having to use the physical embodiment of the HMI 610 (i.e., the smartphone, tablet, computer, etc. on which the HMI 610 operates). For example, the path planning system may implement reconfiguration instructions as standing orders that are followed when the feedback system input 804 observes a particular triggering event. For example, the path planning system 800 may be programmed to react to a user's audio instruction to "move lights here" by triangulating the position of the user's voice using microphones (e.g., by variances in audio intensity or time delay) or identifying the location of a concurrent body gesture, by sending one or more agents 100 to the indicated location.

Manual reconfiguration instructions may be fully-defined—that is, they provide discrete instructions that are not dependent upon the environmental conditions. For example, a fully defined instruction would be to add a certain number of lights to a particular location, or to go to a predefined arrangement. Predefined arrangements can take any form, such as: a "conference mode" arrangement (e.g., lighting around a central table); an office mode (e.g., lighting at locations corresponding to workstations); an exhibition mode (e.g., bright lighting and a microphone at a stage and dim lighting and speakers elsewhere); a logo or advertising mode (e.g., lights arranged to form a corporate logo); a video mode (e.g., LCD panels clustered together in a rectangular pattern to operate as a video display screen or pixel-addressable OLED panels that serve as both light sources and display screens); and so on. These configurations preferably can be created and edited by users with administrative privileges, and such creation and editing may be done by any suitable input. For example, configurations may be created by using a graphical user interface, such as described below in relation to FIGS. 11-13B. Configurations also may be created by manually arranging agents 100 in a desired pattern, and storing that arrangement in the database 806. In this case, the relative positions of the agents 100 may be determined using intra-agent communications to evaluate their positions relative to one another, or the configuration may be determined using a feedback system, such as an RTLS 614, camera 808, or the like.

Manual reconfiguration instructions also may be partially-defined, or dynamic. A partially-defined instruction would require the system to undertake some reactive or logical process to accomplish the desired goal. For example, one partially-defined instruction would be to have a spotlight follow a person, which would require the system to track the person's movement. Similarly, an instruction may be to follow a person moving on a stage, which would require the system to identify a region associated with a stage, identify a person on the stage, and track that person's movement within the stage region. Another partially-defined instruction would be an audio command to "place a light here," which would require the system to identify the location for the light. Other alternatives will be apparent to persons of ordinary skill in the art in view of the present disclosure.

In use, the path planning system 800 may, as a first step, identify whether the manual instruction is fully-defined or partially-defined, such as by matching an instruction to a stored, predetermined agent configuration. For example, if the database 806 includes a particular "conference mode" arrangement, the path planning system 800 would be able to identify the specific arrangement desired immediately upon receiving the instruction to go to the "conference mode." If the database 806 does not have a predetermined arrangement for the agent swarm 702 associated with the particular instruction, then the path planning system 800 may process the instruction to formulate dynamic operating instructions. For example, if an instruction is provided to "follow the speaker on the stage," the path planning system 800 may identify a range of x-y coordinates corresponding to a stage (which could be predetermined and stored information) and then query the agents 100 to identify any movement detected within that range of x-y coordinates. Upon identifying movement, the path planning system 800 would instruct one of more agents 100 to begin following the speaker (e.g., using motion sensors, audio sensors, or a combination of the two) until further instructions are provided. Other alternatives will be apparent to persons of ordinary skill in the art in view of the present disclosure.

The orchestration controller 612 also may maintain a record of each agent's configuration. This information may include, for example, one or more of: a unique identifier associated with the agent 100, the agent's particular functional devices (e.g., whether the agent 100 is equipped with a light source, microphone, optical sensor, and so on), the agent's physical position, the agent's operative state (e.g., light source is on or off), and so on. Positional information may be provided by the feedback system input 804, and may include a map of the x-y plane or three-dimensional space of the environment in which the agent swarm 702 operates, and other data, such as described below. The map may be pre-programmed, user-defined, established by the feedback system input 804 or agent swarm 702, and so on.

Upon determining what configuration is desired, the path planning system 800 may send the instructions to the agent swarm 702 via the swarm communication system 802. The swarm communication system 802 may comprise any suitable communication device, such as a WiFi, NFC, ultrasonic, infrared or Bluetooth transceiver. As one example, the wireless transceiver may be a Bluetooth Low Energy® (BLE) transceiver. The swarm communication system 802 (and other communication devices such as the agent's communication transceiver 608) may be any suitable device compatible with one or more types of wireless communication signals, protocols and/or systems, for example, Radio Frequency (RF), Visible Light Communication (VLC), Infrared (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other examples may use various other devices, systems and/or networks.

It will be appreciated that the swarm communication system 802 cooperates with the agents' wireless communication systems to form a wireless communication network. This network may operate using a single communication signal type (e.g., all via WiFi), or multiple communication signal types (e.g., some communications via Wifi and others via infrared signal), and any number of communication protocols or languages may be used within the wireless communication network. The HMI 610 and feedback system input 804 also may communicate via the same wireless communication network, or by other networks. The swarm communication system 802 may be able to communicate with all of the agents within the agent swarm 702, or it may be configured to communicate only with one agent or a limited number of agents, which then relay communications to other agents within the swarm 702.

If the orchestration controller 612 maintains a record of the agents' physical positions or operative states, the path planning system 800 may use this information to develop agent-specific instructions to send to the agent swarm 702 to effectuate a desired reconfiguration. For example, the path planning system 800 may evaluate an overall change in state of the agent swarm 702 that is required to change from the current configuration to the new configuration, and develop an optimized plan to change to the new configuration based on controlling all or a portion of the agents in specific, individual ways. The optimized plan may minimize the time to change to the new configuration, minimize the number of movements necessary to change to the new configuration, or perform some other desirable reduction in operative requirements or improvement in efficiency or system cost. Upon developing the plan, the path planning system 800 sends the appropriate instructions to the agent swarm 702 to move some of all of the agents 100 to the new configuration. These instructions may specifically tell every agent 100 what to do even if some agents need not change their operative state, or it may only send instructions to those agents 100 that must move or otherwise change operative state. The latter option reduces communication bandwidth and may be preferred in some examples.

Although some examples may use a path planning system 800 that evaluates and controls the movements of each individual within the agent swarm 702, such specific and centralized control can require unnecessary communication bandwidth, particularly in cases in which one or more agents 100 do not need to move to achieve the desired reconfiguration. As such, in some examples, the orchestration controller 612 may simply communicate the desired final configuration to the agent swarm 702, and place the burden on the swarm 702 to decide how to move to the new configuration, as described in more detail below. The orchestration controller 612 also may switch between centralized control of the swarm and allowing the swarm to determine how to achieve the desired reconfiguration, depending on the circumstances. The orchestration controller 612 also may use combinations of instruction methods (e.g., instructing one group of agents 100 specifically how to operate, and instructing another group of agents 100 to operate as an independent swarm to work out how they should achieve a desired objective such as tracking a user).

The orchestration controller's feedback system input 804 is configured to receive and process information about the operation of the agents 100 or the state of the environment. The feedback system input 804 may be connected to or comprise any suitable feedback system. For example, the feedback system input 804 may receive information from a RTLS 614 that evaluates the positions of some or all agents 100 using any suitable position-determination techniques. In such a system, each agent 100 may include a radio frequency ("RF") identification tag (e.g., a RTLS tag 616) that emits a unique identity signal, and a plurality of RF receivers that detect and track the unique identity signals of all of the agents 100. In such systems, three or more RF receivers may be used to allow location of the agents 100 via conventional triangulation or trilateration. Another RTLS 614 may use sound waves, infrared light, or other signal sources, and associated receivers, to identify and track the agents in real time. For example, each agent 100 may periodically emit a respective identification signal through an infrared emitter associated with a proximity sensor 114, while somewhere nearby an optical camera 808 detecting in the infrared range may detect the positions and movements of the agents 100 by identifying these unique identification signals. As another example, an infrared motion capture camera such as those available from Vicon Oxford (a division of Oxford Metrics) of Oxford, England may be provided to track retroreflective markers placed on each agent 100. As another example, a "lighthouse" system may be provided to flood the working environment with scanning line lasers, and each agent 100 may include receptors (e.g., photosensors) to detect when they are struck by the line lasers and thereby resolve the location of the agent 100 relative to the lighthouses. Such systems are commercially available in the form the HTC VIVE headset available from HTC Corporation of Taiwan.

The camera 808 or RTLS 614 also may be used to track the movement or positions of the agents 100 without necessarily being able to identify specific agents 100 within the agent swarm 702. For example, a wide-angle visible light camera 808 may be located to face the surface upon which the agents 100 move, and an associated computer system (e.g., the orchestration controller 612) may be programmed to evaluate image data from the camera 808 to observe the configuration of the agent swarm 702 using conventional object recognition and tracking algorithms.

Other feedback tracking 810 systems also may be used. For example, each agent 100 may collect odometry data and data regarding the identity of nearby agents 100 as it moves, and the data from the agent swarm 702 may be collated or processed to develop a map of each agent's location. The agent map may include positions of the agents relative to one another, the positions of the agents 100 within a map of the environment, or both. For example, in one example, the environment surrounding the agent swarm 702 may include geographic markers, such as barcodes or unique structures or features, that the agents 100 can identify as they move, in order to build a map and/or position themselves on a map. In these or other examples, the agents 100 may use conventional simultaneous localization and mapping ("SLAM") techniques to collectively develop a map of the environment and the agents' locations within that environment. SLAM and swarm SLAM are well-known navigation techniques, and need not be described in greater detail herein. In another example, the agents 100 may develop local position data reflecting their respective positions relative to one another (e.g., Agent A is between Agent B and Agent C, etc.) and an external camera 808 may generate a global map showing the relative positions of all of the agents without necessarily identifying any agent by a unique identifier. In this case, the orchestration controller 612 can collate the agents' local position data and the global map from the external camera 808 to identify the unique position of each agent within the agent swarm 702. Other alternatives will be apparent to persons of ordinary skill in the art in view of the present disclosure.

In still other examples, it is expected that the odometry data for each agent 100 may be sufficiently robust and error-free that it can be used to generate an accurate map of the agent's location without additional input or data collection. For example, the track system 200 described above may provide essentially error-free movement and movement tracking. In this case, the feedback system input 804 would simply receive odometry data from the agents 100.

The feedback system also may include environmental feedback sensors. In one example, data from optical sensors 140 on the agents 100 may be directed to or though the feedback system input 804 to provide an indication as to whether the agents 100 are properly positioned or whether operating conditions (e.g., light intensity) should be modified to achieve a desired goal. For example, information from the optical sensors 140 can be used to determine whether a particular part of a room is sufficiently bright, and, if not, more agents 100 can be sent to that location or the agents 100 at the location can be operated with a higher light output intensity.

Information about the configurations of the agents 100 gathered by the feedback system input 804 also may be fed into the path planning system 800 to provide closed-loop feedback to control the movement and operation of the agents 100. For example, data provided by the RTLS 614 can be used to determine when an agent 100 is not in the proper location by comparing the agent's actual location to the location where the agent 100 should be to achieve the desired configuration. This information also may be transmitted to the HMI 610 to provide a human user 704 with an interactive view of the agents' operation, and may be used to track agent usage and other data associated with the system. Other types of and uses for a feedback systems will be readily understood by persons of ordinary skill in the art in view of the present disclosure.

Figure 9:
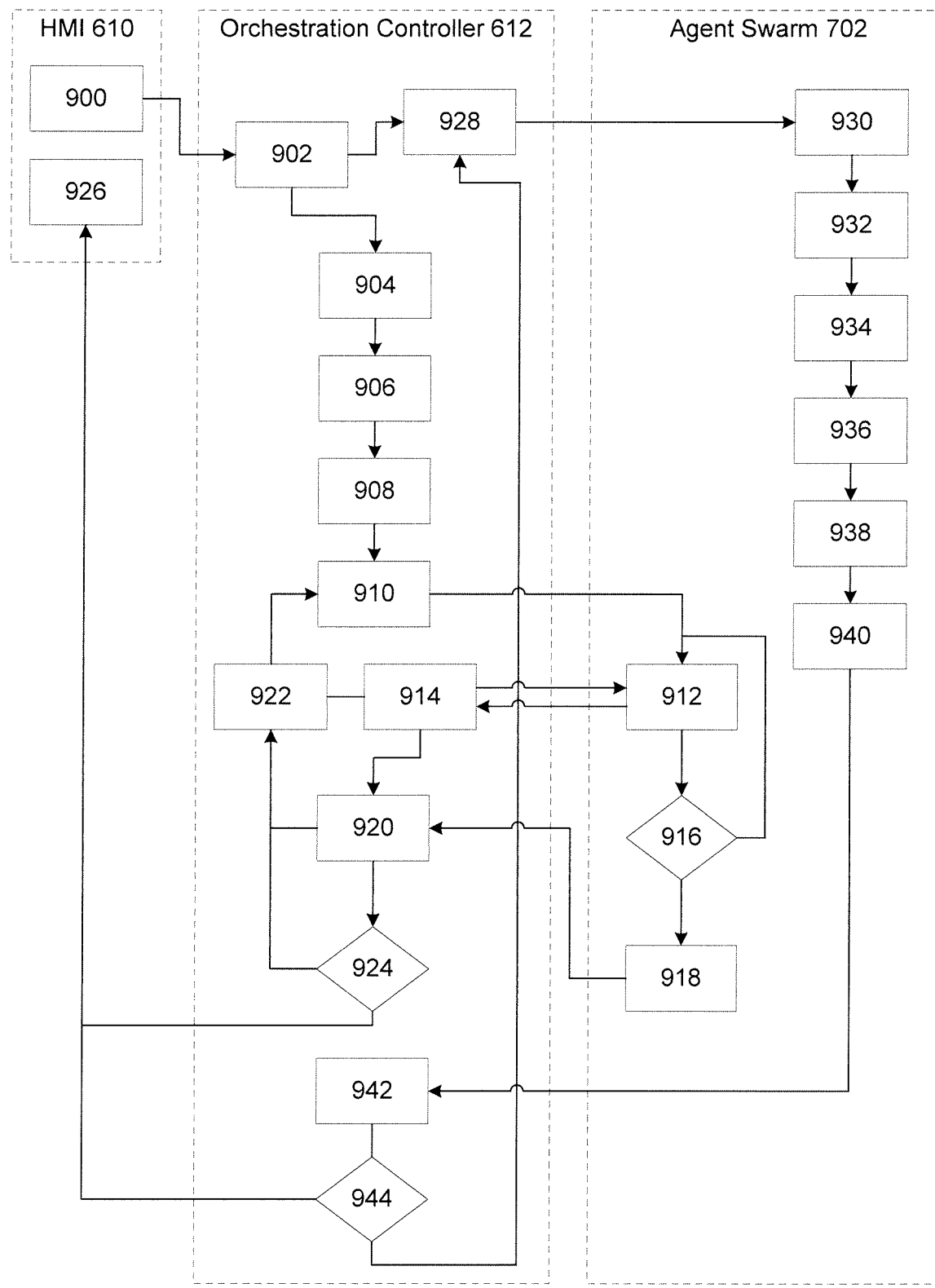
FIG. 9 is a flow diagram of an example of an operation process for a human user interface, orchestration controller, and agent swarm.

An example of a process for performing an agent reconfiguration is illustrated in FIG. 9. In step 900, a human operator enters a request for a reconfiguration using a HMI 610. For example, the human operator may select a predetermined agent configuration or identify a location to which to send one or more agents 100. This request is transmitted to the orchestration controller 612, such as described above.

In step 902 the orchestration controller 612 obtains configuration updates from all of the agents 100. This may be done by sending a query to the agents 100 to identify their location, using a feedback system to identify the agents' locations, looking up the agents' location in a database where the locations were previously stored, and so on. The configuration updates also may include data regarding the operational states of the agents (e.g., light intensity settings and so on).

In step 904, the orchestration controller 612 identifies any differences between the existing agent configuration and the desired new agent configuration. These differences may include differences in physical position, operative state, and so on.

In step 906, the orchestration controller 612 recruits the necessary number and type of agents to perform the desired reconfiguration. For example, the new configuration may require more agents than are previously being used, in which case the orchestration controller 612 will recruit unused agents. Alternatively, the new configuration may require only some of the currently-operating agents to continue operating, and the orchestration controller 612 may remove agents from the active roster by instructing them to go into a standby mode, move to a reserve location, or otherwise disable themselves.

In step 908, the orchestration controller 612 determines optimized paths to the locations required for the new configuration. These paths may be optimized to reduce transit time, reduce energy requirements, reduce the number of overall changes to the entire agent swarm 702, and so on.

In step 910, the orchestration controller 612 assigns and transmits instructions to the agents in the active roster to follow the optimized paths to the endpoints required for the new configuration. These instructions may be formatted and transmitted in any suitable manner. For example, in one example, the instructions simply identify a set of destination coordinates for each particular agent, and the agents are programmed to autonomously plot and execute a straight-line movement to the destination coordinates. Destination coordinates may be expressed, for example, as x-y coordinates or x-y-z coordinates. Destination coordinates also may include angular orientation data to indicate rotation about one or more axes. Conflicts between moving agents can be resolved locally by the agents using conventional obstacle detection and avoidance algorithms, and such conflicts can be reduced or avoided by appropriate timing of the agent's movements. In another example, the instructions may include relatively complex path movements and timing information to ensure that the agents do not conflict with one another during the reconfiguration process.

The transmission of instructions in step 910 may be performed in various ways, such as described previously herein. For example, the orchestration controller 612 may send an instruction signal directly to each affected agent, or it may send such instruction signals indirectly to the affected agents via other agents within the agent swarm 702. The agents conveying instruction signals from the orchestration controller 612 to the affected agents may or may not be within the group of agents that are actually moving to the new configuration. For example, one or more agents may act as immobile relay beacons to convey messages to the agents that are changing configuration to achieve the new configuration. The orchestration controller 612 may, however, actively move such relay beacon agents if the space between adjacent agents becomes too great to support reliable communication between them.

In step 912, each agent in the active roster navigates to the designated endpoint. As noted above such navigation may be according to specific drive instructions sent by the orchestration controller 612, or performed according to the agent's internal programming. In either event, the agents may communicate with one another to facilitate the overall transition to the new desired configuration, such as by sending and reacting to avoidance signals and the like.

The process also may incorporate one or more feedback control systems to actively monitor the position of the agents. In this case, process step 912 may be performed iteratively with a feedback control step 914. In this step, a feedback system may periodically or continuously evaluate the position or other operating conditions of the agent, and send corrective or updated movement instructions to assist the agent with reaching the destination endpoint or the desired operative state. The use of a feedback control step 914 may be particularly beneficial when large movements are being made, as errors in odometry measured by an agent may tend to be higher as distances increase. Thus, where an agent is only required to move a relatively short distance (e.g., as measured by traveled distance or the amount of expected odometry error), the system may affirmatively suppress the feedback control step 914 to reduce communication bandwidth requirements and allow less restricted feedback communication for agents that are moving relatively large distances. The feedback control step 914 also may be used to help correct other operating conditions. For example, if the desired change in configuration is to move the agents to provide uniform lighting throughout a room, then the feedback control step 914 may comprise evaluating light intensity registered by each agent's optical sensor 140, and continuing to adjust the agents' positions and/or light intensity output until the desired uniformity is achieved. Other alternatives will be apparent to persons of ordinary skill in the art in view of the present disclosure.

At step 916, each agent determines whether it has reached its final configuration. In some cases, this may be done based on the agent's own ability to navigate and identify its surroundings or otherwise evaluate its surroundings. As noted above, the agent's estimation of its own position may be achieved using one or more of odometry data (e.g., encoders, an IMU 138 or the like) and observed data (e.g., optical sensors and the like), and such data may be processed in any way to estimate the position of the agent (e.g., SLAM techniques, swarm SLAM techniques, etc.). The determination at step 916 also may be made based in whole or in part on feedback provided by a feedback system as implemented in step 914, or based on other input to the agent (e.g., a separate agent informing the agent in question that no further movement is required).

If the agent determines that it has not reached its final configuration, it continues back to step 912 to continue moving to its final configuration (possibly using feedback as in step 914). When the agent determines that is has reached its final configuration, the process for the agent moves to step 918, in which the agent sends a provisional completion message to the orchestration controller 612 stating that the agent has completed its reconfiguration. The provisional completion message may comprise a simple message, such as an indication that the agent has completed making the instructed change in configuration (e.g., "process complete"). Also, the provisional completion message may include other information, such as a statement of the agent's perceived physical position (e.g., x-y coordinates) or other operating conditions (e.g., light intensity setting).

The provisional completion message may be processed by the orchestration controller 612 in step 920, to determine whether the agent has properly completed the instructions to change its operating configuration. For example, in step 920, the orchestration controller 612 may query a feedback system to identify the location of the agent (e.g., confirm the agent's location using a camera 808), or access a record log of a closed loop feedback control step 914 to attempt to separately determine the agent's position. In other cases, the orchestration controller 612 may simply accept the agent's own configuration assessment as being correct (i.e., no feedback or external confirmation is used). The position verification in step 920 may be performed for each agent in the active roster until the reconfiguration process is complete.

The orchestration controller 612 may use the provisional completion messages to update the reconfiguration instructions to the agent swarm 702 during the reconfiguration process. For example, the orchestration controller 612 may determine that a portion of the desired final configuration is sufficiently complete despite the fact that certain agents assigned to form that part of the configuration have not yet arrived at their instructed locations. This may happen, for example, if the final configuration is to provide a certain light intensity at a location, and the feedback system indicates that the agents already at the location satisfy that requirement without requiring more agents to participate. Under these circumstances, the orchestration controller 612 can generate an updated instruction mid-reconfiguration to tell other agents that they no longer need to go to that particular location, or to redirect those agents to other locations. If it is determined that additional or updated instructions are necessary or beneficial, the orchestration controller 612 may proceed to step 922 to identify a new set of optimized paths or changes to assume the desired overall final configuration, and then issue those instructions to the agent swarm 702 via a closed loop control step 914 (if used) or by transmitting completely new instructions via step 910.

Once all agents have completed their reconfigurations and sent their provisional completion messages to the orchestration controller 612, the process moves to step 924, where the orchestration controller 612 compares the final configurations of all of the agents to the desired final configuration to determine whether the overall final configuration has been achieved. As with step 920, the orchestration controller 612 may make this final determination by simply relying on the agents' own assessments of their operating configurations (no feedback), or by relying in part or in whole on a feedback system to determine whether any aspects of the desired configuration are still missing after all agents have reported their positions. For example, the orchestration controller may evaluate images from a camera 808 to determine whether there are any empty spaces where an agent should be. The orchestration controller 612 also may evaluate other environmental features, such as checking the distribution of light within a room, to ensure that the final configuration is satisfied. If the final configuration is not satisfied, the orchestration controller 612 moves to step 922 to evaluate what changes must still be made and to prepare and issue instructions to make those changes, and the process continues as before.

It is also envisioned that step 920 can be skipped by performing the final position verification step 924 for the first time only after all agents have reported in. This minimizes communication bandwidth requirements, but may make the overall process more cumbersome because the orchestration controller 612 cannot participate in making interim reconfiguration corrections, such as described above.

If the orchestration controller 612 determines in step 924 that the final configuration is satisfied, it may generate a final completion signal and send this to the HMI 610 to report completion to the user in step 926. The final completion signal may comprise any useful information, such as an indication that the reconfiguration is complete, configuration information regarding the agents' position or operating conditions, environmental information (e.g., a light intensity map of a room), and so on. The orchestration controller 612 also may periodically send the HMI 610 updates on the reconfiguration process before it is complete, such as by sending updated agent positions to be displayed on the HMI 610, sending an estimate of time remaining to complete the reconfiguration, error codes, and so on.

In this example, steps 912-918 generally describe how the agent swarm 702 may operate under the primary control of the orchestration controller 612. In other aspects, the agent swarm 702 may be primarily controlled by the agent swarm 702 itself by, for example, distributed emergent behaviors. For example, in step 928, the orchestration controller 612 may send a final desired configuration to the agent swarm 702 without specific instructions as to how one or more of the agents within the agent swarm 702 should operate to achieve the desired configuration. When the agent swarm 702 is tasked with determining how to achieve the desired configuration, it may not be necessary to determine the locations of the agents ahead of time, and thus step 902 (identifying the agent locations) may be omitted in some implementations of this example to conserve computing resources.

In step 930, some (and preferably all) agents in the swarm 702 receive the orchestration controller's final configuration instructions. The instructions may be received directly from the orchestration controller 612 by each agent, or the agents may pass the instruction to one another if only one or a few of the agents receive the instructions directly from the orchestration controller 612. For example, the orchestration controller 612 may use relatively short-range communications to transmit the instructions to those agents close enough to receive the instructions, and those agents may distribute the instructions to the other agents via infrared communication or other local communications devices, as discussed above. The agents may introduce additional information or modify information within the instructions as they are communicated among the agents. For example, agents may identify aspects of the instructions that have already been satisfied by one or more agents, so that other agents do not duplicate efforts. The intra-agent communications also may include verification signals to confirm that each agent has received the same set of instructions. Other alternatives will be apparent to persons of ordinary skill in the art in view of the present disclosure.

After the agents receive the instructions, in step 932 the agent swarm 702 determines how to achieve the desired final configuration. For example, the agent swarm 702 may determine that a certain number of agents (or enough agents to provide a certain light intensity) must be located at particular locations throughout the environment to satisfy instructions to provide a particular lighting pattern (e.g., "a group of eight agents must be centered at coordinates x-y"). The agents also may develop a plan to ensure adequate intra-agent communication throughout the reconfiguration process (e.g., do not exceed a maximum spacing between agents).

Next, in step 934, the agents within the agent swarm 702 communicate with one another to build their collective knowledge of the overall configuration of the entire agent swarm 702 and/or the local environment. For example, the agents may conduct local surveys to identify the positions and identities of nearby agents to develop a map of the entire agent swarm 702, or the agents may identify ambient lighting conditions at their respective locations. This information may be collated to generate one or more complete or partial maps of the environment.

In step 936, the agents update their configurations to obtain the desired overall configuration. This step may be performed at the global level. For example, all of the agents may be assigned particular tasks, such as by setting a destination end point for each individual agent. This step also may be performed at a local level, such as by grouping the agents into task forces to separately accomplish particular tasks (e.g., group 1 builds a spotlight at one location, and group 2 builds a distributed light at another location). The decision on how to move also may take into account the locations of nearby agents and how those relationships change during the reconfiguration process. For example, one agent may trade jobs with another agent if doing so would avoid having to traverse long distances or avoid running into other agents within the agent swarm 702.

At step 938, the agents arrive at their solution to achieve the end configuration. During this process, agents may signal the group as they accomplish particular reconfiguration tasks, to help avoid duplication of efforts.

In step 940, the agents send one or more provisional completion messages to the orchestration controller 612. Each individual agent may generate its own provisional completion message, or the agents may collectively send provisional completion messages as one or more groups. For example, a group of agents may designate a communication representative that sends a provisional completion message on behalf of the group. The provisional completion message may include an indication that the agent has completed its reconfiguration, the agent's understanding of its location, or other information. The provisional completion messages may be conveyed to the orchestration controller 612 directly or via other agents as intermediaries.

In step 942, the orchestration controller 612 receives the provisional completion messages from the agent swarm 702, and in step 944 the orchestration controller 612 determines whether the agent swarm 702 has properly achieved the desired reconfiguration. As explained earlier in relation to step 924, this determination may be made by relying on the agents' own assessments of their final positions, or by employing one or more feedback systems 804 to separately evaluate the agents' positions. If the agent swarm 702 has achieved the desired reconfiguration, the process continues to step 926 as discussed above.

If the agent swarm 702 has not achieved the desired reconfiguration, the process continues to step 928, in order to reinstruct the agent swarm 702 as to the desired final configuration. In this iteration of step 928, the orchestration controller 612 may repeat its original instructions essentially verbatim, or it may modify its original instructions to increase the likelihood that the agent swarm 702 will be successful. For example, the orchestration controller 612 may modify the final configuration instructions by indicating that certain aspects of the configuration have already been satisfied by certain agents or groups of agents. Thus, the instructions would include partial instructions to those agents that have not satisfied the desired configuration. Other alternatives will be apparent to persons of ordinary skill in the art in view of the present disclosure.

It will be appreciated and understood that the foregoing process may be modified in various ways. For example, step 900 may be an instruction generated internally by the orchestration controller 612 based on a schedule reconfiguration trigger or an automated reflexive reconfiguration trigger or the like, such as described above. As another example, step 902 or other steps may be omitted in some cases, when those steps are not necessary or do not add significantly to achieve the desired results. It will also be appreciated that the steps may be performed in any suitable order. Also, some agents may be performing some steps (e.g., step 914 of reporting its final configuration) while other agents are still completing other steps (e.g., step 912 of moving to the new configuration).

Figure 10:
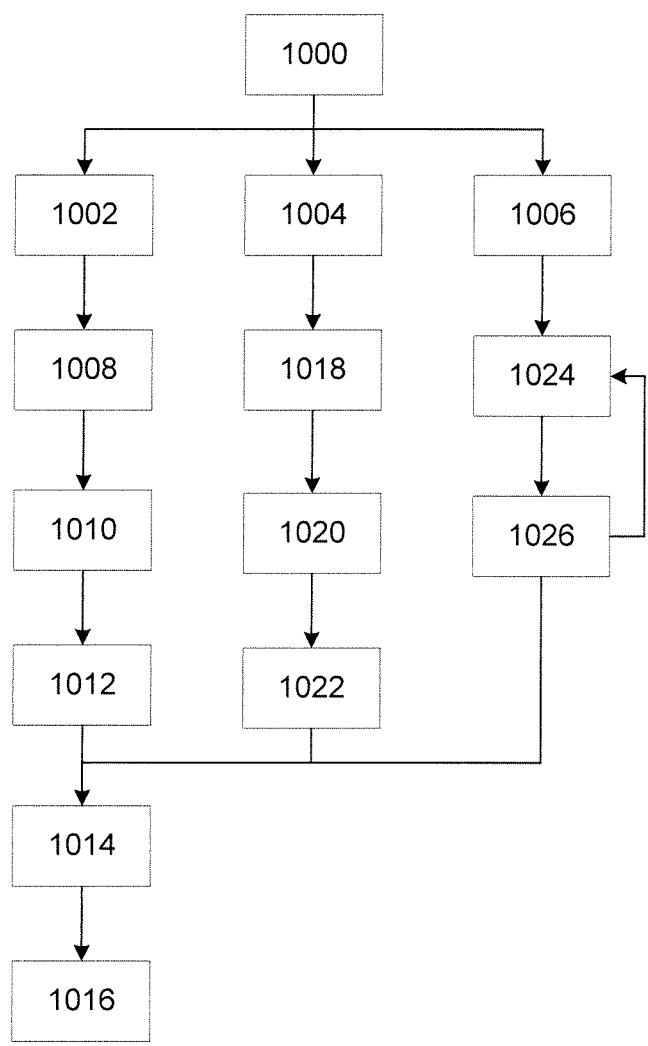
FIG. 10 is a flow diagram of an example of an agent swarm operation process.

FIG. 10 illustrates an example of an agent swarm 702 process flow. In step 1000, the orchestration controller 612 sends instructions to the agent swarm 702. The instructions include the desired end configuration, such as a list of target locations and a number of fixtures for each location. The instructions may be based on a determination by the orchestration controller 612 of the existing agent positions, an evaluation of which agents are currently idle, and other aspects of the agent swarm's current configuration, and the instructions may account for the existing configuration when formulating the instructions. For example, the instructions may instruct an idle subset of agents to provide the desired end configuration, in order to prevent active agents from changing their current configuration.

Upon receiving the instructions, the agent swarm 702 selects one or more strategies to accomplish the end configuration. Exemplary strategies include identifying a leader to follow 1002, identifying a stationary coordinator 1004, or using distributed intelligence 1006. The type of strategy may be based on the particular type of instruction.

The "follow the leader" strategy 1002 may, for example, be used when a relatively small number of agents must be positioned at a discrete location. In this control strategy, the agent swarm 702 identifies an agent as the leader to direct one or more followers to a new configuration. The leader may be selected randomly, or by one or more metrics to help assure efficient or effective execution of the reconfiguration. For example, the leader may be an agent having the most battery charge to allow longer movements without recharging, or it may be an agent that is closest to or farthest from the target destination, or it may have the best characteristics (e.g., a particular type of light source 104) to achieve the desired configuration. The leader also may be a unique class of agents that have particular navigation abilities that other agents lack, such as a LIDAR rangefinding laser to navigate more effectively over longer distances, as compared to short-range navigation devices such as paired infrared emitters and detectors. If multiple aspects of the agent swarm 702 must be reconfigured, multiple leaders may be selected to achieve different aspects of the reconfiguration.

In step 1008, the leader or the agent swarm 702 calculates a path for the leader to take to get to the target destination. The path may be based on optimizing travel distance (e.g., shortest distance), considerations for power efficiency (e.g., a path that intersects wireless multiple inductive chargers), and so on.

In step 1010, the leader recruits available agents to follow it to the target. For example, the leader may recruit nearby agents as followers, or recruit agents it encounters on its way to the destination. Alternatively, the agent swarm 702 may select the followers at the same time as or after selecting the leader. For example, the agent swarm 702 may identify a group of agents near the leader's starting location or along the path from the leader to the target, or it may identify a group having high battery charge levels to make a longer traverse before settling into the new configuration.

In step 1012, the leader moves towards the target destination, and the followers follow the leader. As the leader moves, the followers may move to remain in contact with the leader, such as by maintaining communications by short-range communicators. This minimizes the need to provide specific instructions to the followers. Nevertheless, in some examples, the agent swarm 702 or the leader may share the calculated path with the followers, or even calculate separate movement paths for one or more of the followers. This may be helpful where the followers are widely distributed before the reconfiguration process, in order to ensure that a sufficient number of followers arrive at the target site.

During movement the leader and followers may need to adjust their movement paths. This may be necessary, for example, to account for collisions or possible collisions with other agents, to avoid obstacles, to stay within a predefined operating region, to pass by charging stations or inductive chargers to maintain operation, or to account for mechanical failures or navigation failures among the members of the group. For example, the leader and followers may execute a series of simple collision avoidance routines, such as by using contact sensors or infrared sensors to detect proximity to and avoid hitting other agents. As another example, if the leader runs out of battery charge and stops, one of the followers may be promoted to the leadership role. If a follower becomes stuck or otherwise cannot continue, a new follower may be recruited by the leader, or sent to the group by the agent swarm 702 upon the leader's request to recruit another agent. Similar corrective actions can be made if the leader or a follower becomes lost or inadvertently splits off from the group. In some cases, the group may lose a sufficient number of agents to compromise the ability to provide the desired end configuration, or the group may lose agents having particular desired characteristics (e.g., no microphone agents are available, as desired for the end configuration). In this case, the process may return to step 1000 to reattempt the process, or an error signal may be send to a user.

In step 1014, the leader and followers reach the target position and form the final configuration. At this point, the leader may issue additional commands to instruct the followers how to assemble (e.g., in a straight line, in a square, in a ring, and so on). The final assembly process also may include distributing the followers in a predetermined pattern, such as by dropping individual followers at spaced locations to form a string of lights along a certain desired path. Thus, forming the final configuration can involve closely assembling agents together or docking them to one another, spreading a traveling group of agents apart, or making other movements to obtain the final configuration. It is also envisioned that agents can be docked together prior to or during the movement to the final destination. In those cases, one or more agents may provide the motive force and/or drive controls necessary to tow one or more other agents to the final destination, or different agents may take on different driving roles (e.g. one agent drives in the x-direction, and another agent drives in the y-direction). Other alternatives will be apparent to persons of ordinary skill in the art in view of the present disclosure.

In step 1016, the leader (and possibly one or more followers) may send a provisional completion message to the orchestration controller 612 to initiate verification that the new configuration has been reached. From here, the process may proceed as described in the example of FIG. 9.

The strategy of selecting a stationary coordinator 1004 may be used in various circumstances, such as when the agent swarm 702 must execute a large scale reconfiguration or it would be inefficient or ineffective to assign one or more leaders to accomplish the goals. In this strategy, an agent is selected to be the coordinator (or multiple agents are selected to be regional or task-specific coordinators, etc.) to issue instructions to the remaining agents. In this strategy, the coordinator may be selected at random, based on battery charge level, based on its central position or ability to communicate with a large number of agents, or by other criteria.

The coordinator may begin the reconfiguration in step 1018 by identifying agents that are available for make the new configuration. This may comprise all of the agents, or a group of the agents. This information may be provided in the instructions from the orchestration controller 612. Alternatively, the coordinator may send a query to the agent swarm 702 to identify the status of each agent to find free agents or those agents that are performing lower priority tasks.

Upon identifying the available agents, the coordinator plans one or more movement paths 1020 for the agents to take to reach their final destination or destinations. For example, the coordinator may determine a separate path for each agent to travel and assign it to each agent. Alternatively, the coordinator may identify a common path for multiple agents to take to reach the destination. For example, the coordinator may instruct each agent to follow a certain path and report back to the coordinator when it reaches the end of the path. In this case, the agents may be required to determine on their own how to move to the start of the common path. The coordinator also may identify an order in which the agents should move to the destination. For example, the coordinator may identify the start of a common travel path as being located at the geometric center of a recruited group of agents, and then instruct each of the agents in the group when to start moving towards the beginning of the travel path. The coordinator can thus stagger the movements of the agents along the common travel path to prevent or reduce collisions.

In step 1022, the coordinator issues the travel instructions to the agents. The coordinator may track the movements of the agents using a feedback system, such as periodically updated communications from the agents about their positions or the positions of nearby agents, or messages from a feedback system (e.g., camera 808) that is separate from the agent swarm 702. (From the foregoing discussion, it will be appreciated that the agent coordinator may effectively take on the role of a local orchestration controller 612, in which case it may issue commands and otherwise control the agent swarm 702 as described in steps 902-924 above and elsewhere herein).

Upon reaching the destination, the process may proceed essentially as described above with respect to step 1014 and the following steps. For example, the agents may report to the coordinator that they have reached the destination, and the coordinator may provide final instructions for how to assemble the agents together. Then, the agents or coordinator may send a provisional completion report to the orchestration controller 612. The orchestration controller 612 may then send additional instructions if necessary to obtain the desired configuration.

In the distributed intelligence method 1006, each agent takes initiative to achieve the desired end configuration. In step 1024, each agent may select an aspect of the final configuration to resolve. This selection may be random, partially random, based on the locations of the agents at the time the instructions were issued, and so on. Upon identifying a goal, each agent acts in step 1026 to achieve that goal. Periodically during this process the agents may communicate with one another to identify what their individual goals are, how close they are to achieving those goals, and so on. If multiple agents have overlapping goals, the agents can resolve this by scoring their own progress towards that goal, and allowing the "winner" to continue while the "losers" select other goals. For example, if two agents are found to be planning to move to a certain light location specified in the end configuration, the distances from the agents to that location may be determined, and the closer agent may continue to the location while the other agent may return to step 1024 to select a new goal. If no scoring method is possible, the agents may all continue until one reaches the common goal, or one or more agents may be randomly selected to undertake a different goal. Other alternatives will be apparent to persons of ordinary skill in the art in view of the present disclosure.

The distributed intelligence method 1006 may be particularly useful for achieving certain end configurations. For example, if the end configuration is to provide uniform lighting throughout a room, each agent may determine the light intensity using its optical sensor 140, compare the intensity to nearby agents, and then move towards a nearby agent having a lower light intensity measurement. This process may be suitable to use local feedback at each agent to develop a uniform lighting configuration using only the agents' distributed intelligence. Such a process can also include movement damping functions or other control aspects associated with the goal, in order to improve its efficiency. The distributed intelligence method 1006 also may be useful to arrange agents in fixed geometric patterns (e.g., equal distance between all agents), or in other circumstances. Other alternatives will be apparent to persons of ordinary skill in the art in view of the present disclosure.

As with the other strategies, the agents eventually reach their final destination or configuration goal 1014. When each agent arrives at its own goal (or when all of them are finished moving), the agent swarm 702 can send one or more provisional completion messages to the orchestration controller 612 to indicate that the reconfiguration is complete, as described above in relation to step 1016. The orchestration controller 612 may then verify whether the final configuration has indeed been achieved, as described above.

The foregoing example of a distributed intelligence method 1006 is just one manner in which the agents can operate using distributed intelligence. In other cases, different algorithms may be used. Also, some examples may use combinations of methods to achieve the desired final configuration. For example, a combination of one or more of following a leader 1002, using a stationary coordinator 1004 and using distributed intelligence 1006 may be used to address a particular reconfiguration. For example, an instruction to place a spotlight at a certain point, and equally redistribute the remaining lights in a particular area may be accomplished by using a leader to guide one set of agents to the spotlight location, and using a coordinator or distributed intelligence to place the remaining agents.

It will be understood from this disclosure that the agents 100 may use the wireless communication network to issue any number of different operation signals to one another and to the orchestration controller 612 throughout the course of the reconfiguration process. Such operation signals can include any type of operating information. Examples of operation signals can include, but are not limited to: proximity indication messages to identify themselves to other agents, relay messages to convey instructions between an orchestration controller (or agent leader or agent controller) and other agents, status messages indicating the current operational status of the agent (e.g., drive heading, intended destination, current task assignment, light intensity setting, etc.), collision resolution messages to indicate how to navigate around one another, assembly instructions indicating how to assemble together or coordinate movement, other instructions or information to effectuate the processes described herein, and so on.

Figure 11:
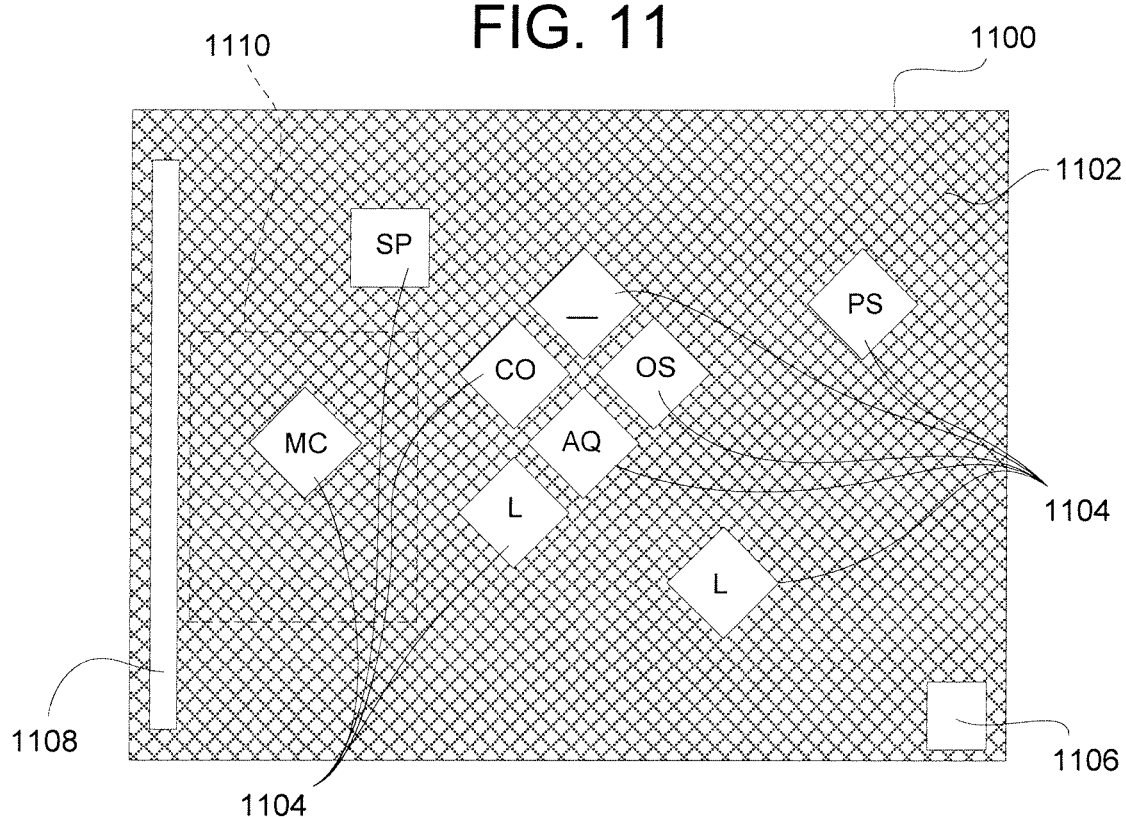
FIG. 11 illustrates an example of a human user interface for use with an agent swarm when showing a first example of a selected configuration of a robotic agent swarm.

FIG. 11 is an example of an interface 1100 for an HMI 610. The interface 1100 may comprise a video screen, such as a monitor of a computer terminal or mobile device. The interface 1100 schematically illustrates an environment 1102 and the positions of multiple agents (shown by agent icons 1104) within the environment. The agents 1104 may be labeled by unique agent identifiers, such as serial numbers or labels that indicate the functional devices of the agent 1104. For example, in this example, each agent 1104 includes a feature code, such as "PU" for a projector unit, "AQ" for an air quality sensing unit, "L" for a lighting unit, "SP" for a speaker unit, "MC" for a microphone unit, "CO" for a communication unit, "VDU" for a variable distribution unit, and "OS" for an occupancy sensing unit (e.g., a movement or heat sensor). If desired, such labels may be provided in different forms, such as by coloring the agents 1104 using a color code, or making the agents 1104 with different shapes corresponding to different agent types. The interface 1100 also may include environmental features or obstacles, such as a column 1106 or wall 1108. The outer perimeter of the environment 1102 also may represent a boundary wall that surrounds a holonomic operational area in which the agents 1104 operate. The interface 1100 also may include user-defined virtual regions 1110, such as a podium region or an audience, that do not necessarily correspond to real-world physical boundaries.

The information displayed in the interface 1100 may be generated by any combination of automated methods (e.g., the robot swarm identifying obstacles using SLAM algorithms or the like, environmental mapping by a camera, RTLS tracking of agents, etc.) and/or manual methods (e.g., manual user input to generate a room map, virtual regions, or agent positions). The information in the interface 1100 may be generated by an orchestration controller 612, by a HMI 610, or by other operative parts of the overall system.

The interface 1100 may be configured simply as a tracking device to update the positions of the agents 1104, but more preferably it is an interactive control system that allows the human user to manipulate the positions of the agents 1104. Interaction may be via touchscreen sensors integrated into the interface 1100, a computer keyboard or mouse, and so on. For example, the interface 1100 may be configured to allow a user to select an agent 1104 or a group of agents 1104, and drag the agent 1104 to a new location within the environment using "click, drag and drop" inputs. Upon doing so, the user may be prompted to instruct the orchestration controller 612 to execute the change or cancel the change. If the user selects to execute the change, the orchestration controller 612 will issue new instructions to the agent swarm to perform the desired reconfiguration. The interface 1100 also may be connected to a database of predetermined agent configurations to allow a human user to view and select from various different configurations. Any suitable menu structure may be provide for accessing different configurations (e.g., scrolling, thumbnail views, text descriptions, and so on). The interface 1100 also may be functional to allow users with certain privileges to create new configurations or edit and save existing configurations. Other alternatives will be apparent to persons of ordinary skill in the art in view of the present disclosure.

Figure 12:
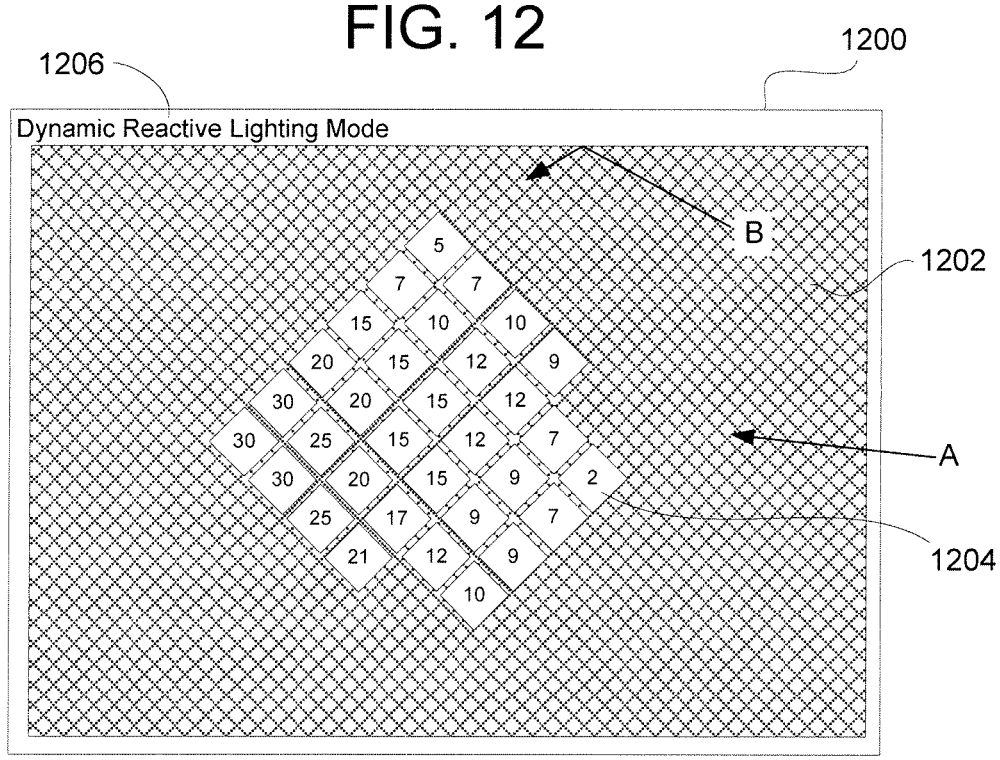
FIG. 12 illustrates another example of a human user interface for use with an agent swarm when showing another example of a selected configuration of a robotic agent swarm.

FIG. 12 illustrates another example of an interface 1200 for an HMI 610. In this case, the interface 1200 schematically illustrates an environment 1202 and the positions of agents by agent icons 1204. The interface 1200 also includes a label 1206 indicating the operation mode of the agent swarm. In this case, the operation mode is a "dynamic reactive lighting" mode, in which the agents 1204 use their optical sensors 140 or other feedback to attempt to equalize the light distribution within the environment 1202 or within a portion of the environment 1202. In this example, light may be entering the environment from the right-hand side as shown by arrow A, and this light may be strongly reflected by a wall at the upper side of the environment, as shown by arrow B. It will be appreciated that this is a schematic top plan view of the environment, and terms or relative position (e.g., "right-hand" and "top") are used simply to identify positions with respect to the interface 1200. It will also be appreciated that arrows A and B are provided to illustrate the situation within the real-world environment, and the interface 1200 would not necessarily include arrows A and B.

The interface 1200 may be functional to dynamically select display features based on the particular operating mode. For example, in the dynamic reactive lighting mode, each agent 1204 may be labeled to indicate its light output. Light output may be according to an arbitrary scale selected to cover the range of light output intensities available from the agents 1204 (e.g., a scale of 0-30, with 0 being no output and 30 being maximum output), or they may be based on some other scale (e.g., duty cycle or voltage applied to a light source 104, etc.). In this case, each agent 1204 is labeled with its light intensity output on a scale of 0-30, and it can be seen that agents 1204 closest to the incoming light (arrow A) and the reflected light (arrow B) are operating at relatively low output, while the agents 1204 further from the light are operating at a higher output. From viewing this information, and with the knowledge that the agents 1204 are currently operating in a mode that attempts to equalize lighting within the room, one can surmise that the agents with the lower output are located in regions having higher ambient light levels, and those operating at higher output are located in regions having lower ambient light levels.

Other examples may use other labels, such as a gray-scale or color-scale to represent light output. Also, other modes may use other information labels. For example, in a presentation mode the agents 1204 corresponding to a spotlight on a speaker may have one label, and room lighting over the audience may have a different label. Other alternatives will be apparent to persons of ordinary skill in the art in view of the present disclosure.

Figure 13A:
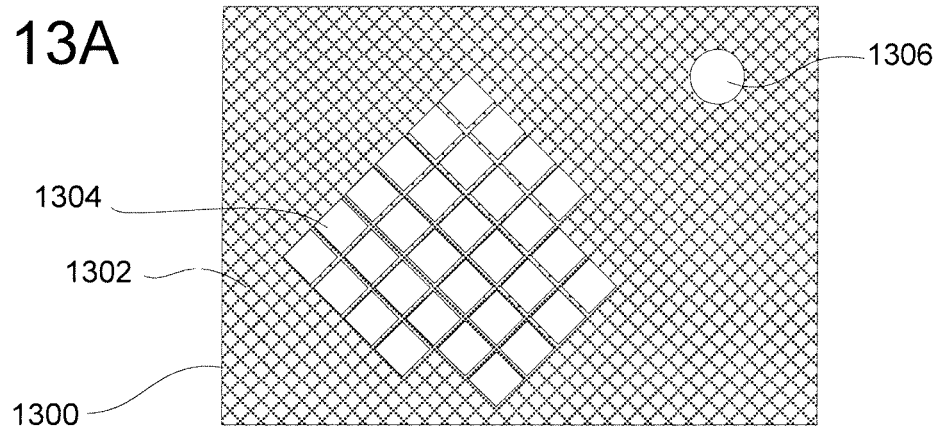
FIGS. 13A-13C illustrate another example of a human user interface in the process of reconfiguring an agent swarm.
Figure 13B:
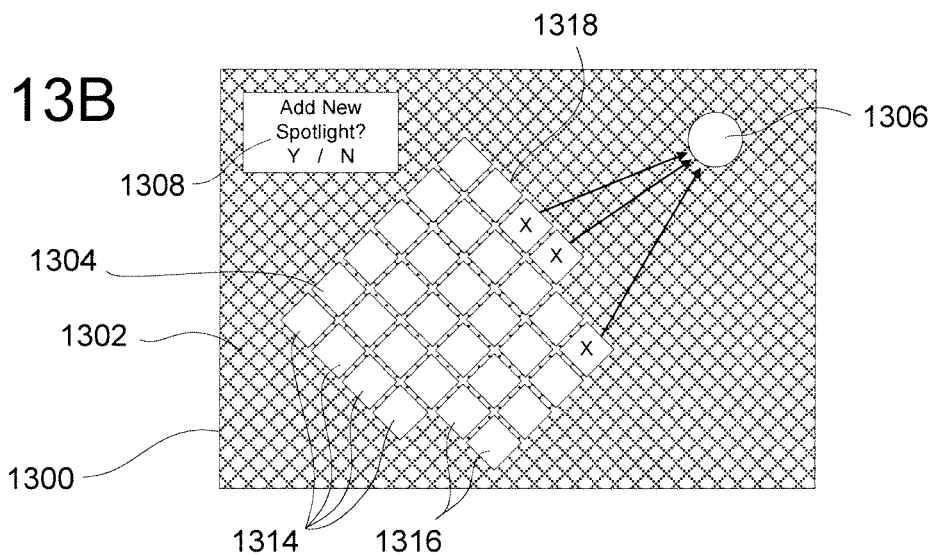
Figure 13C:
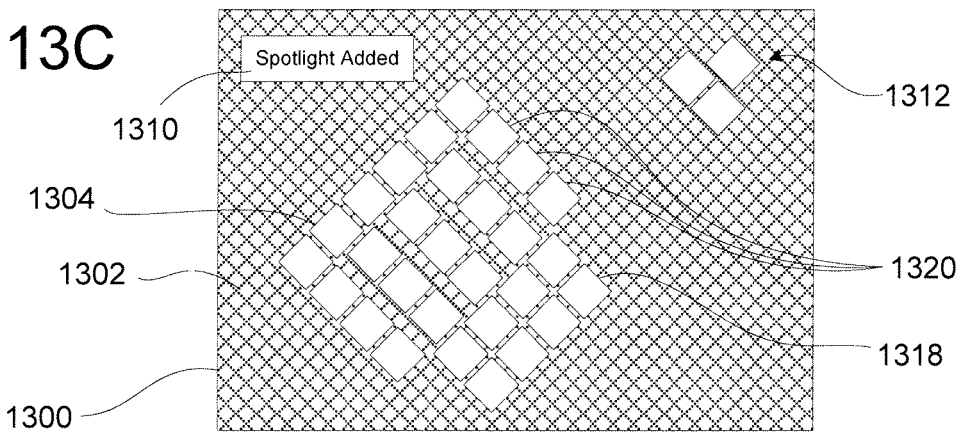

FIGS. 13A-13C illustrate the use of an interface 1300 to dynamically adapt the agent configuration to a user's request to provide a spotlight at a particular location. Once again, the interface 1300 schematically illustrates the environment 1302 and uses icons to show the agents 1304 at their locations within the environment 1302. FIG. 13A shows the agents' 1304 current configuration, along with a user-generated spotlight location 1306. The spotlight location 1306 may be generated in the HMI 610 by touching the desired location on the interface 1300, using a mouse pointer to select the location, by selecting from a menu of possible spotlight locations, by identifying coordinates for the spotlight, and so on.

Upon receiving the new spotlight location 1306, the HMI 610 may send an instruction to the orchestration controller 612 to create and execute a plan to move the agents 1304 to new configuration. In this process, The HMI 610 may perform error-checking functions or provide intermediate information to the user before initiating the reconfiguration. For example, the HMI 610 may generate a prompt 1308 asking the user to confirm the desired reconfiguration, such as shown in FIG. 13B. The HMI 610 also may display a reconfiguration plan on the interface 1300, such as by identifying the agents 1304 that will be moved to form the spotlight by numbers or the like and indicating travel paths for these agents. The HMI 610 may develop the reconfiguration plan on its own, or by communications with the orchestration controller 612.

Preferably, the HMI 610 and/or orchestration controller 612 performs a check to ensure that the user's desired reconfiguration is possible, before executing the instructions. For example, the orchestration controller 612 may determine whether there are physical constraints that would prevent the swarm from achieving the desired configuration, whether there are sufficient agent resources to form the desired reconfiguration, whether the agent swarm includes the desired addition (e.g., adding a microphone if there are no agents equipped with microphones), whether the agents will be able to reach the desired destination, and so on. Upon confirming that the reconfiguration is possible, the HMI 610 displays the prompt 1308 to ask the user whether to carry out the reconfiguration. If the reconfiguration is not possible, the HMI 610 may indicate that there is an error, the nature of the error, or other information to the user.

Upon receiving confirmation from the user (if requested), the HMI 610 sends the appropriate instructions to the orchestration controller 612, and the agents 1304 perform the reconfiguration. During this process, a group of agents 1304 moves to create the new spotlight 1312. The agents forming the spotlight 1312 also may reconfigure in other ways, such as by changing their focusing properties or light emission direction to generate the desired illumination pattern. The remaining agents 1304 also may reconfigure themselves to provide or attempt to provide the same lighting pattern that the full group of agents 1304 originally provided prior to the reconfiguration request. For example, the area lighting pattern shown in FIG. 13A included four rows 1314 of six agents, and two rows 1316 of four agents. To generate the spotlight 1312, agents 1304 were removed from two of the six-agent rows 1314, and one of the four-agent rows 1316. To maintain the original area lighting pattern, one agent 1318 may be moved from one of the six-agent rows 1314 to reform the original four-agent row 1316, and the three rows 1320 that now have five agents may be reconfigured by increasing the spacing between adjacent agents to fill the space originally provided by the former six-agent rows 1314. The lighting intensity of one or more of the agents 1304 also may be adjusted to provide the original area lighting pattern and intensity. The exact reconfiguration performed to recreate the original pattern may be automatically generated by the orchestration controller 612 based on an evaluation of the lighting pattern, autonomously generated by the agents 1304 using feedback from internal sensors (e.g., moving and adjusting light output to recreate light intensity values detected prior to the reconfiguration), ordered by the human operator, and so on. Other alternatives will be apparent to persons of ordinary skill in the art in view of the present disclosure.

Following the user's confirmation that the reconfiguration is desired, or after the reconfiguration is complete, the interface 1300 may be updated, such as shown in FIG. 13C, to indicate the new positions of the agents 1304. The interface 1300 also may include a completion message 1310 when the reconfiguration is complete. The interface 1300 also may include intermediate messages or information between the time the reconfiguration command is issued and the time of completion. For example, the interface 1300 may illustrate the movement of the agents 1304 schematically or track their positions in real time. The interface 1300 also may display error messages to indicate that one or more agents 1304 are not able to achieve the desired configuration. Other variations and options for the interface 1300 will be apparent in view of this disclosure.

A user instruction, such as the instruction to add a spotlight, also may be generated by other techniques. For example, the position of the HMI 610 may be tracked by a feedback system and indicated on the interface 1300, and the user may move to the desired location with the HMI 610 and issue a command (e.g., add spotlight here) to perform a reconfiguration based on the user's current location. Such commands may be entered via the HMI 610 such as by selecting the command from a drop down menu, by audible input via a microphone or the like, and so on. The system also may include a beacon, other than the HMI 610, that the system can track to identify a location for a command. For example, a suitable beacon could comprise a cluster of infrared-reflective balls that can be tracked using conventional infrared stereotactic tracking systems as commonly used in surgical environments. As noted above, other examples may use user-tracking or gesture-based command inputs. Other alternatives will be apparent to persons of ordinary skill in the art in view of the present disclosure.

It will be appreciated that systems and methods for operating an agent swarm may be stored in any suitable non-transitory computer-readable memory, software, or the like. For example, the methods for operating an orchestration controller, agent swarm, HMI and feedback devices may be stored in the combination of permanent or updatable embedded code or firmware in the agents, software that can run on a smartphone or a computer acting as the orchestration controller and/or HMI, and so on. Certain devices, such as gesture sensors, may include their own embedded code that may be integrated into the overall control system. Other alternatives will be apparent to persons of ordinary skill in the art in view of the present disclosure. The particulars of how the operating code is distributed among and stored in the various parts of the agent swarm system should be within the level of skill in the art, and need not be described in more detail herein.

Figure 14A:
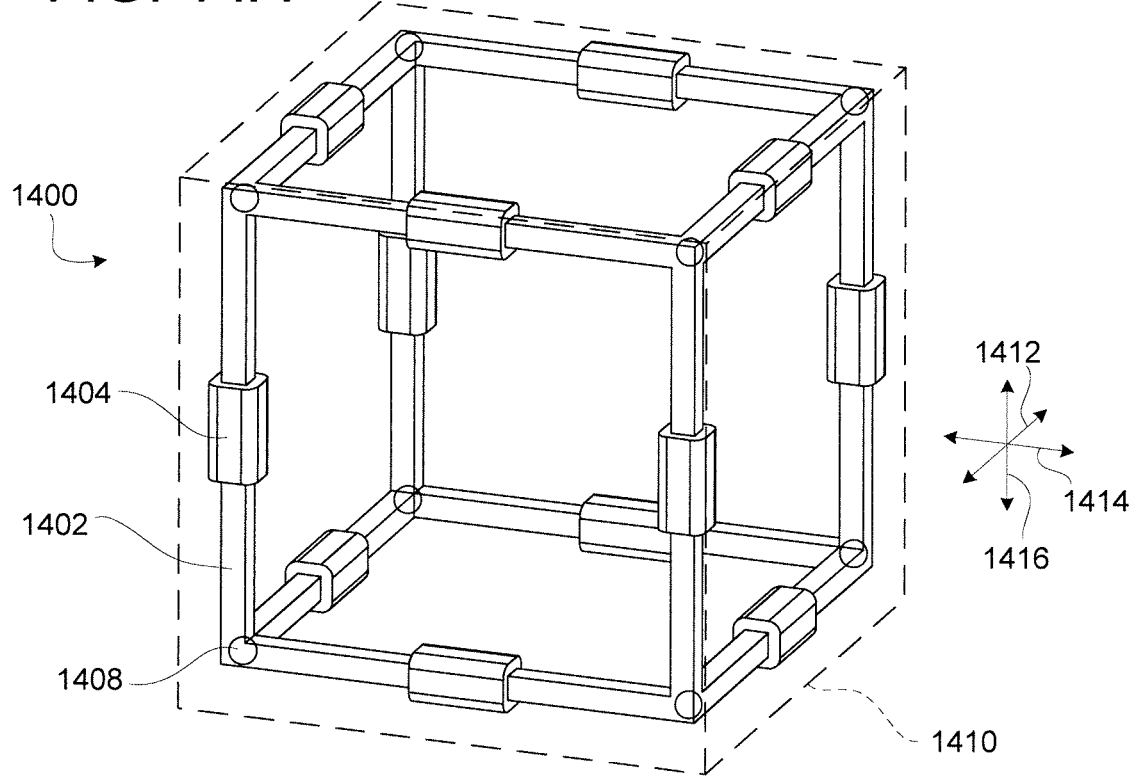
FIGS. 14A and 14B illustrate another example of a terrestrial agent shown in two operative configurations.
Figure 14B:
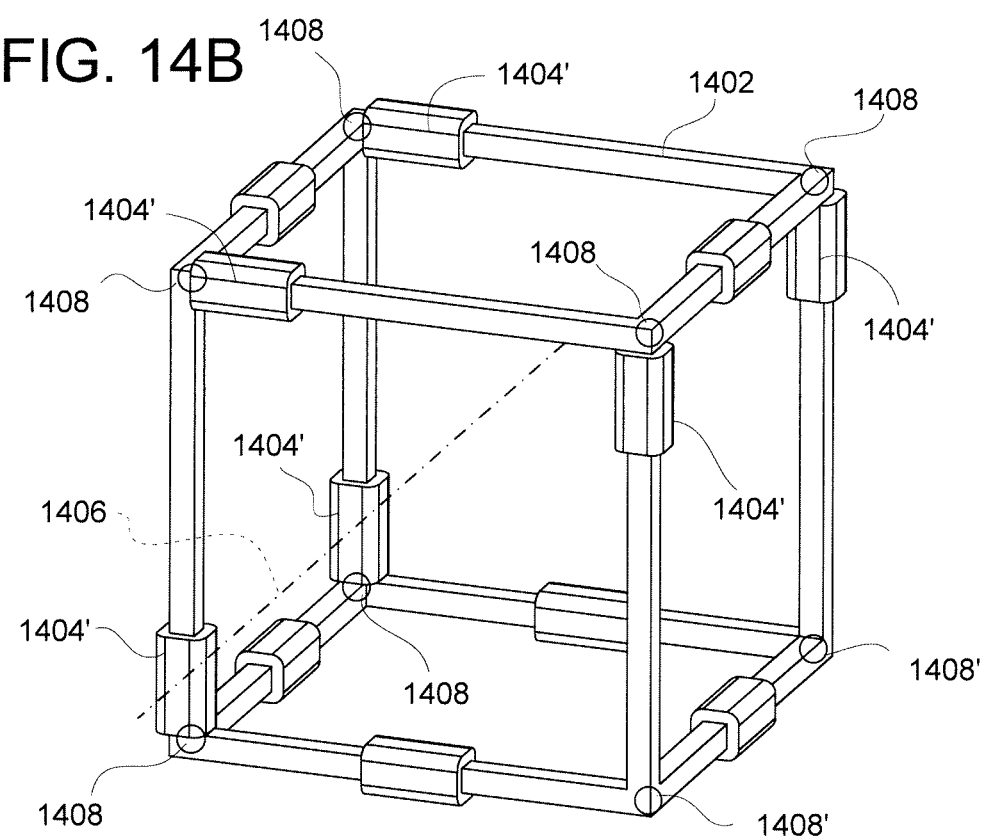

The foregoing examples or control systems and agent features also may be incorporated into other types of agent. For example, another example of an example of an agent 1400 that may be used with an agent swarm system is illustrated in FIGS. 14A-14B. In this example, the agent 1400 comprises a cube-shaped device having twelve rails 1402. The rails 1402 are arranged as edges of a cube shape. Each rail 1402 has an associated weight 1404, which may be external to the rail 1402, as shown, or internal to the rail 1402. The weights 1404 and rails 1402 are shaped such that the weights 1404 can slide along the rails 1402. For example, each weight 1404 may have a square bore and each rail 1402 may have a square cross-sectional profile as viewed along the rail's long axis. The rails 1402 preferably are straight, but they may be curved.

Each weight 1404 is movable along its edge rail 1402 by a drive mechanism, such as an electromagnetic coil, a fluid pump, or the like. For example, each rail 1402 may include a coiled wire, and each weight may comprise a permanent magnet. Applying an electric charge to the wire causes the weight 1404 to move along the rail 1402. The weights 1402 may be arranged to move relative to the remainder of the agent 1400 along discrete paths corresponding to three axes of the agent's body; namely a first body axis 1412, a second body axis 1414 that is perpendicular to the first body axis 1412, and a third body axis 1416 that is perpendicular to the first body axis 1412 and the second body axis 1414. Each body axes 1412, 1414, 1416 may be perpendicular to two of the six faces of the cube-shaped arrangement of rails 1402. This configuration is expected to provide improved simplicity in the control of the agent 1400, but other axes of relative movement may be used in other examples.

Moving the weights 1404 in coordinated patterns can apply a rotation moment to the agent 1400 and can change the center of gravity of the agent 1400. For example, as shown in FIG. 14B, moving certain weights 1404' such that they strike the ends of their respective rails 1402 generates a moment force M that tends to rotate the agent 1400 about a rotation axis 1406 that is perpendicular to the direction of the impact forces.

This moment force M can be used to move the agent 1400 across a drive surface. For example, the agent 1400 may be secured to a surface or to another agent 1400 by a mechanism (e.g., magnets) that prevents the agent 1400 from moving while the weights 1404' are being accelerated towards impact, but the connection strength may not be sufficient to resist the relatively high combined moment force M that is generated at the moment of impact. Thus, the impact of the weights 1404' will release the connection and cause the agent 1400 to tumble about the rotation axis 1406. Similarly, the connecting device or devices can be selectively released just before the weights 1404' strike the ends of their rails 1402, which will also allow the agent 1400 to tumble about the rotation axis 1406. The change in the center of gravity caused by the movement of the weights 1404 is expected to make this tumbling movement more effective.

While the shown example has twelve rails 1402, other examples may use fewer or more rails 1402. Also, the rails 1402 need not be arranged as a cube. Furthermore, other moment-generating mechanisms may be used in other examples. For example, an agent may have three pendulums oriented at 90 degrees to each other, with each pendulum being movable about a single body axis 1412, 1414 or 1416 along an arc between two fixed travel stops. Accelerating any one of the pendulums so that it strikes a travel stop will generate a rotation moment similar to the operation of the example of FIGS. 14A and 14B. As before, if the force applied to generate the acceleration is not sufficient to release the agent from its connection to the surface or to another agent, but the moment generated by the impact is sufficient to release this connection (or if the connection is actively released shortly before the moment of impact), the movements of the pendulums can be harnessed to tumble the agent along the drive surface. As another example, the foregoing solid weights may be replaced with liquid weights in the form of volumes of liquid (e.g., water, mercury, etc.), and the agent 1400 may include a number of liquid reservoirs at different locations, and pumps (e.g., piston pumps, peristaltic pumps, etc.) that can be activated to move the liquid from one reservoir to another to generate momentum changes.

The agent 1400 also includes one or more connection devices, such as one or more magnetic elements (permanent magnets, electromagnets, electro-permanent magnets, ferromagnetic materials, etc.) to secure it to other agents 1400 or to a ceiling or other drive surface upon which the agents 1400 operate. For example an electro-permanent magnet 1408 may be provided at each apex where three sides of the cube meet, or at the center of each cube face. These magnetic elements 1408 may be selectively de-energized to release certain corners of the agent 1400 to guide the tumbling motion. For example, in the example of FIG. 14B, just before the weights 1404' strike the ends of their rails 1402, all of the magnetic elements 1408 may be de-energized except for two magnetic elements 1408' located in a line that is parallel to the rotation axis 1406. These two magnetic elements 1408' provide a hinge about which the agent 1400 will tumble. During or at the end of the tumbling motion, some or all of the magnetic elements 1408 may be reactivated to secure the agent 1400 to a new position.

It will be appreciated that the foregoing momentum-based movement system may be replaced by any suitable alternative mechanism to tumble or manipulate the agent 1400 along a drive surface. For example, each side face of the agent 1400 may include a movable arm that extends to prop up that side and cause it to pivot about corner magnetic elements. Other alternatives will be apparent to persons of ordinary skill in the art in view of the present disclosure. As another example, each agent 1400 may be configured as an articulated mechanism that can assume different shapes to generate movement. Such devices are known, for example, in the form of the so-called "Cubimorph" device developed by the University of Bristol in Bristol, England, and the MOLECUBE developed by Festo AG & Co. KG of Esslingen, Germany. These devices include internal motors that manipulate different portions of the device to move relative to one another, and latch mechanisms located in the faces or edges of the different portions to hold the different portions in fixed positions relative to one another. Other devices may be used in other examples.

The agent 1400 is also equipped with other functional devices. For example, the agent may include an exterior housing 1410, electronics, wireless energy receivers, a battery, and other features such as described above. Functional devices, such as lights, microphones, speakers, optical sensors, occupancy sensors, and so on, may be integrated into or attached to the housing 1410, or the rails 1402. For example, LED lights may be embedded in the rails 1402, or a light source may be suspended at the center of the cube shape. If a housing 1410 is used, it may fully-enclose the device and include magnetic elements or other connectors at its outer face. The housing 1410 also may be open to allow airflow through the agent 1400, and may be transparent to allow light to pass therethrough. Other alternatives will be apparent to persons of ordinary skill in the art in view of the present disclosure.

The agent 1400 also may have shapes other than a cube. For example, the housing 1410 may comprise any polyhedral shape, such as a truncated cube, an icosahedron, a dodecahedron, and so on. Having a greater number of sides with larger included angles between adjacent sides is expected to improve mobility by reducing the amount of force necessary to rotate the agent 1400, but may complicate connecting the agents 1400 to other agents 1400 or other surfaces. Nevertheless, examples may have these or other shapes.

As with the examples described above, the agent 1400 may be operated with a swarm of identical or similar agents 1400. The agents 1400 may be suspended via magnetic pads or a mesh to a ceiling or wall, and may be movable to a variety of predetermined or dynamic configurations, as described above. The agents 1400 also may be configured to present a specific face to provide specific functionality. For example, an agent 1400 may have a diffuse light on one face, and a focused light on another face. When diffused light is desired, the face with the diffuse light is oriented towards the area to be illuminated, and when a spotlight is desired, the face with the focused light is oriented towards the area to be illuminated.

Figure 15:
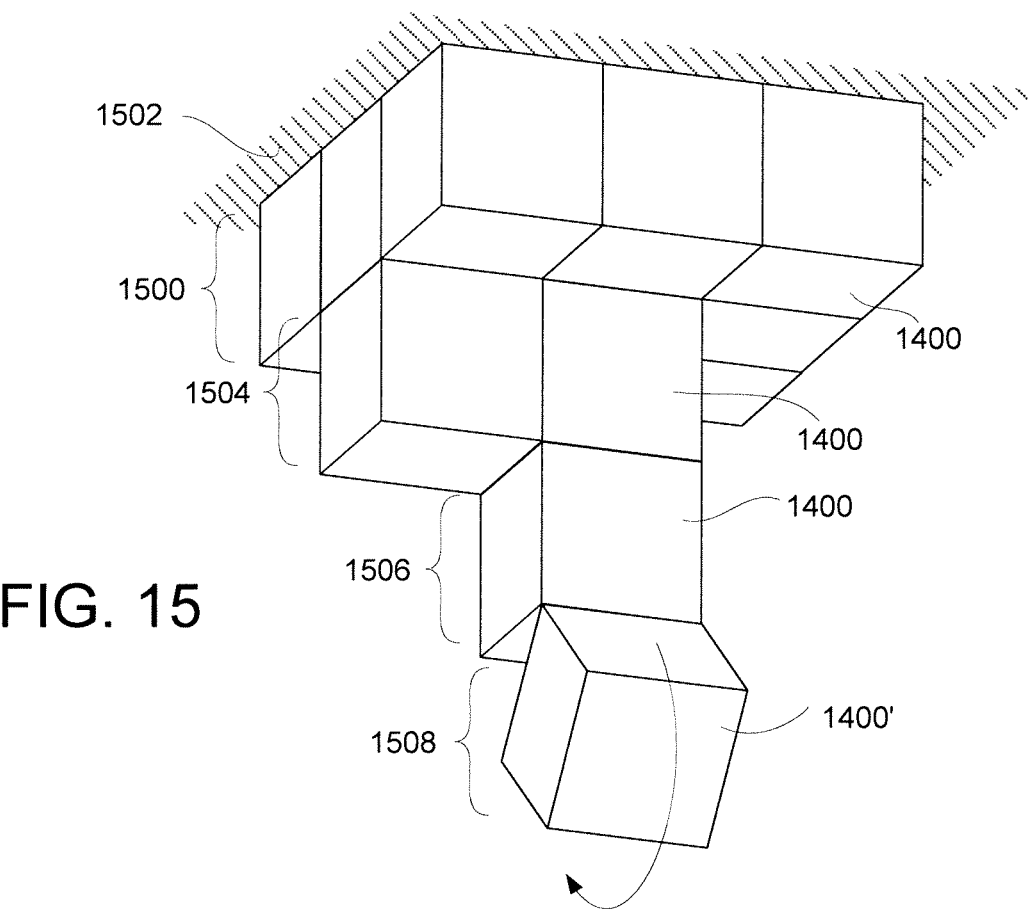
FIG. 15 is a perspective view of a plurality of swarm agents of FIGS. 14A-14B in the process of assembling into an example of a configuration.

An agent 1400 such as shown in FIGS. 14A-B also may be operated in three-dimensional configurations, such as shown in FIG. 15. In this case, a first layer 1500 of one or more agents 1400 is connected to a ceiling 1502 by magnetic elements or the like, a second layer 1504 of one or more agents 1400 is attached to the bottom of the first layer 1500, a third layer 1506 of one or more agents 1400 is attached to the bottom of the second layer 1504, and a fourth layer 1508 is being constructed by rotating an agent 1400' from the third layer 1506 downward to attach it to the bottom of the third layer 1506. The agents 1400 may be positioned in any desirable configuration, provided sufficient holding force is generated to keep the agents 1400 in contact with one another. For example, the agents 1400 may be reconfigured as a pendant lamp, or the like.

Also, one or more of the agents 1400 may be constructed specifically to act as a support to hold other agents 1400 in a three-dimensional arrangement. For example, one or more agents 1400 in the first layer 1500 may comprise particularly strong magnetic holding devices, but lack other features such as light sources. Other alternatives will be apparent to persons of ordinary skill in the art in view of the present disclosure.

The agents 1400 may be operated in any suitable holonomic operational area, such as described above. In this case, however, the holonomic operational area may require particular features to prevent the agents 1400 from bypassing any boundary walls or the like. For example, the boundary walls may comprise a non-magnetic material to prevent the agents 1400 from attaching themselves to and possibly bypassing the boundary wall by forming a three-dimensional structure that wraps around the edge of the boundary wall.

Other examples of agents are shown in FIGS. 16-19. In these examples, the agent is airborne, rather than being "terrestrial" (i.e., moving on a fixed surface) like the previous examples.

Figure 16:
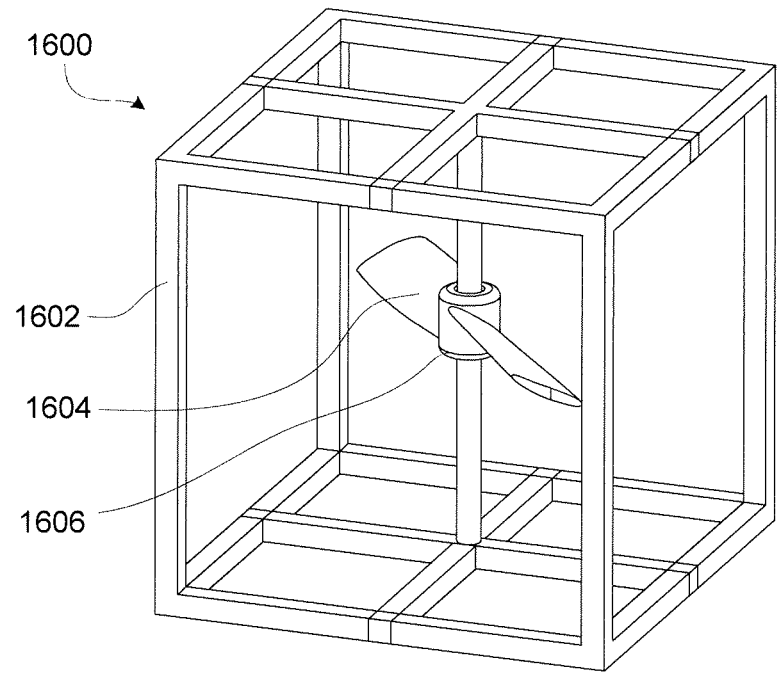
FIG. 16 is a perspective view of an example of an airborne swarm agent.
Figure 17:
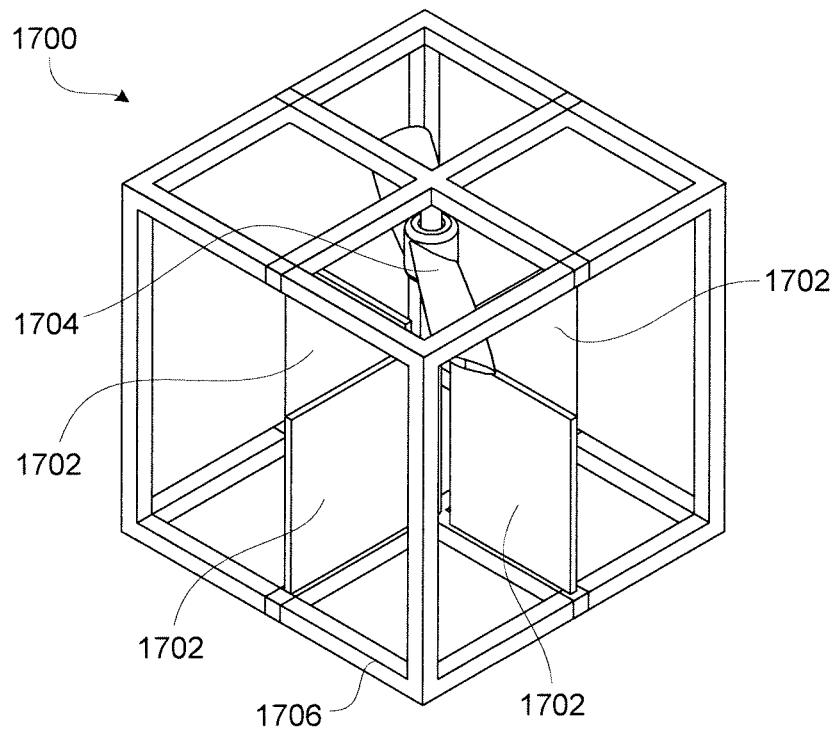
FIG. 17 is a perspective view of another example of an airborne swarm agent.

In FIG. 16, the agent 1600 comprises an airborne movement system to propel the agent 1600 through the air to obtain desired agent configurations. For example, the agent 1600 may comprise a frame 1602 supporting one or more propellers 1604, and a propulsion motor 1606 to drive the propeller 1604. The agent 1600 may include other features, such as lights or other devices, as well as a CPU, a battery, suspension members, magnetic or mechanical locks to hold it onto a surface or to grip other agents 1600, communication and control systems, proximity sensors, a housing, and the like, such as described above. The frame 1602 is open at two or more locations (e.g., the top and the bottom, or the sides and the bottom), to allow air to flow through it.

The agent 1600 may be operated as the other agents described herein, such as by an orchestration controller or according to distributed emergent behaviors, to place it at particular locations within the environment to provide particular lighting patterns or other features (e.g., microphones, speakers, etc.). Also, as with the example of FIGS. 14A-15, the agent 1600 may be operable to form three-dimensional structures.

In general terms, the agent 1600 propels itself by manipulating airflow around the agent 1600. The agent 1600 alters its position along a vertical z-axis by changing the vertical thrust provided by the propeller 1604, which may be accomplished by altering the propeller's speed or blade pitch angle, restricting or increasing the amount of airflow accessible to the propeller, or redirecting the thrust generated by the propeller. Movement in an x-y plane perpendicular to the z-axis is accomplished by generating thrust vectored along the x-y plane. This may be accomplished using a variety of methods. For example, the agent 1600 may include movable ballast (e.g., moving weights such as shown in FIGS. 14A and 14B, hydraulic ballasts, or the like) that can be shifted to offset the center of gravity of the agent 1600 from the center of the thrust vector generated by the propeller 1604. Doing this orients the propeller axis at an angle relative to the z-axis and generates a thrust vector in the x-y plane. In another example, thrust in the x-y plane may be generated by sideways-oriented propellers. In still another example, thrust in the x-y plane may be generated by providing multiple vertically-oriented propellers (e.g., three or four propellers aligned with their rotation axes generally parallel and in the vertical direction), and operating the propellers at different thrust levels to cause a rotation moment to tilt the agent 1600 and generate a thrust vector in the x-y plane.

Airborne agents having a single propeller preferably also include features to prevent counter-rotation of the frame in a direction opposite to the rotation of the propeller. For example, referring to FIG. 17, an example of an airborne agent 1700 also may include movable control surfaces, such as movable guide vanes 1702, to selectively redirect airflow generated by the propeller 1704 to prevent the frame 1706 from rotating during flight. Such control surfaces can also be operated separately or in combination to generate a force to rotate the agent 1700 so that the propeller's thrust has a vector component in the x-y, thereby causing desired lateral movement.

Figure 18:
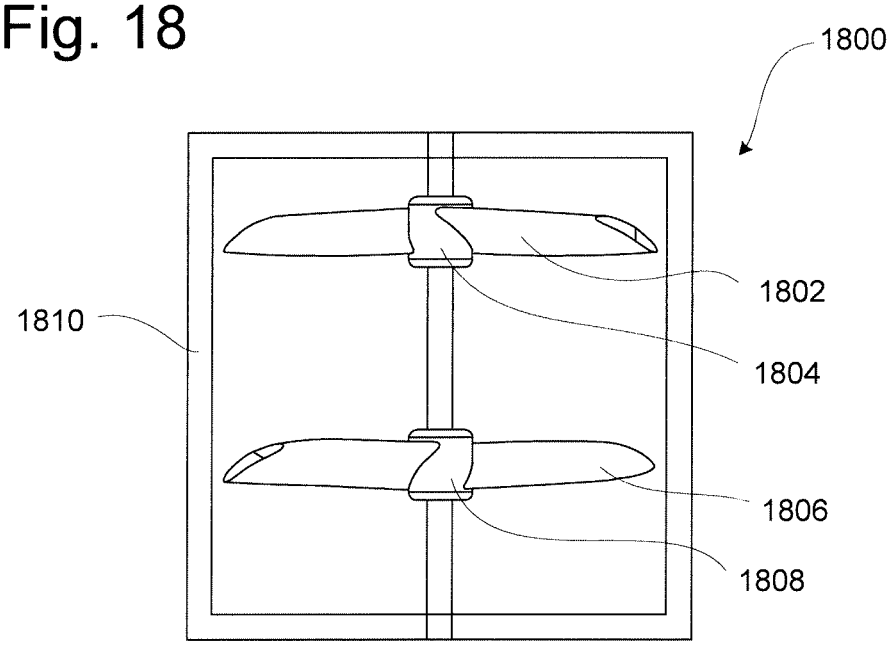
FIG. 18 is a side elevation view of another example of an airborne swarm agent.

Another feature to prevent counter-rotating and increase vertical thrust is shown in FIG. 18. Here, an airborne agent 1800 has a first propeller 1802, a first propulsion motor 1804, a second propeller 1806 and a second propulsion motor 1808. The first propulsion motor 1804 rotates the first propeller 1802 in a first direction (e.g., clockwise, as viewed from above). The second propulsion motor 1808 rotates the second propeller 1806 in a second direction that is opposite to the first direction (e.g., counter-clockwise, as viewed from above). In this configuration, the torques generated by the propulsion motors 1804, 1808 and propellers 1802, 1806 counteract one another to reduce or eliminate unwanted rotation of the frame 1810. In another example, one of the propulsion motors 1804, 1808 may be omitted and replaced by a transmission that drives both propellers 1802, 1806 in opposite directions. The agent 1800 also may include movable control surfaces or the like to help generate desired vector thrust forces and to control rotation of the frame 1810.

Figure 19:
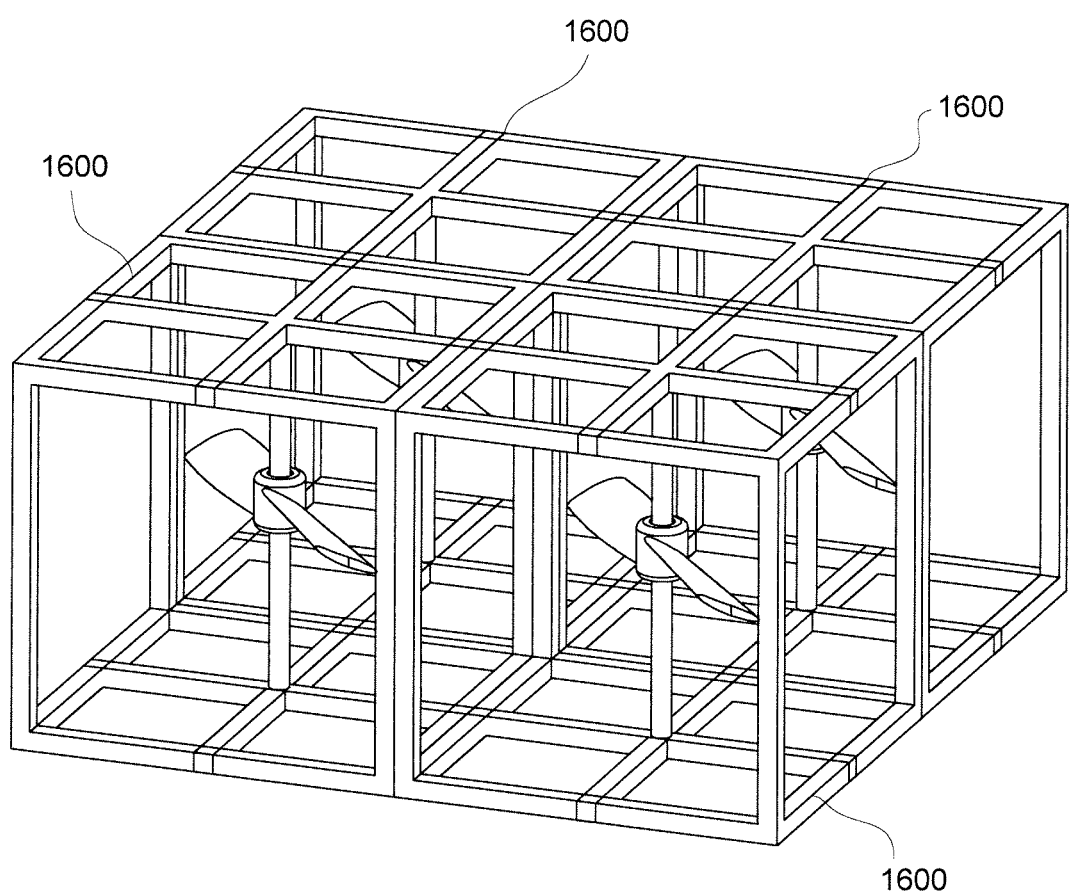
FIG. 19 is a perspective view of a plurality of airborne swarm agents of FIG. 16 assembled into an example of a configuration.

Airborne agents may be operated in essentially the same way as the terrestrial agents described previously herein. For example an orchestration controller may be used to communicate with and direct the airborne agents to particular locations and to perform particular functions. The airborne agents may be operated to assemble into formations in mid-air, such as shown in FIG. 19, and the assembled formation may then anchor itself to a wall or ceiling using magnetic elements or hooks, such as described above. Alternatively, the agents may attach themselves separately to the locations on the wall or ceiling to realize the desired formation in place.

Airborne agents also may be operated by manually organizing them into desired configurations and then issuing an instruction to the agent swarm to activate and organize themselves into the configuration on the ceiling or in the air. For example, a user may arrange a number of agents into a particular desired pattern on a table or floor surface while they are not in flight, and use an HMI or the like to save the configuration. Upon issuing a flight command, the agents may then take to the air as they are (in formation) or separately fly upwards to rejoin in the desired formation at a new location in the air or on the ceiling. Airborne agents also may be able to organize into three-dimensional structures, such as described above in relation to FIG. 15. Electro-permanent magnets or other devices may be used to hold the agents together, or they may fly in formation with local proximity sensors of the like providing feedback to maintain their relative positions. Other alternatives will be apparent to persons of ordinary skill in the art in view of the present disclosure.

Airborne agents also may be advantageous in that they are inherently more accessible for service by a user on the ground. For example, a swarm of airborne agents may be directed to collect at a service location where a user can connect them to battery chargers or replace parts or payloads.

Airborne agents as described above naturally operate in a holonomic operational area provided by the three-dimensional free space of the atmosphere. In these examples, boundaries may be provided by non-physical signals demarking the edges of the holonomic operational area. For example, the architectural surface on which the agents are intended to operate may be surrounded by a collection of structured light lasers that emit planes of laser light at a predetermined wavelength or frequency, and the agents may include sensors to detect these planes of laser light and identify them as the boundaries of the operation space. Examples of the technology described herein are expected to provide a number of unique advantages. For example, a swarm of agents may be easily deployed or installed simply by installing a suitable modular drive surface on a ceiling or by releasing an airborne agent swarm into a room. When using distributed control logic, the individual agents need not be specifically and individually commissioned for particular tasks, which makes them self-organizing and reduces the burden to program individualized control systems for all applications. Movable agent swarms are also easily reconfigured into new lighting scenarios or the like, and are not bound by pre-existing light fixture wiring. Agent swarms also may be modular and readily scalable to suit the environment or task requirements. A swarm of agents is also expected to provide more efficient resource usage by providing light or other functional devices (e.g., speakers or the like) only where they are needed, and freeing up other agents to perform other tasks simultaneously. Also, an agent swarm can react dynamically to changing conditions in the environment, such as changes in ambient lighting and movements of furnishings and human users, to continuously provide desirable lighting in the environment.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. It is intended by the following claims to claim any and all modifications and variations that fall within the true scope of the present concepts.

We claim:

1. A method for operating a robotic agent swarm system, the method comprising:
   identifying a reconfiguration trigger and generating a reconfiguration instruction based on the reconfiguration trigger;
   sending, via a communication network, the reconfiguration instruction from an orchestration controller to a plurality of robotic luminaire agents, each of the plurality of robotic luminaire agents of the swarm system being held at least periodically against an architectural surface comprising a holonomic operational area by a suspension and having a light source configured to illuminate a region in a proximity of the architectural surface; and
   changing one or more operating conditions of one or more of the plurality of robotic luminaire agents in response to the reconfiguration instruction, including holonomically moving at least one of the plurality of robotic luminaire agents from a first position on the holonomic operational area to a second position on the holonomic operational area;
   wherein:
   the reconfiguration trigger comprises detecting a change in respective light intensity at a plurality of measurement locations in the region in the proximity of the architectural surface, and
   the reconfiguration instruction comprises an instruction to change one or more of a respective light intensity output of the respective controllable light source of the one or more of the plurality of robotic luminaire agents, and changing a physical position of the one or more of the plurality of robotic luminaire agents, to equalize the respective light intensities at the plurality of measurement locations.

2. The method for operating a robotic agent swarm system according to claim 1, wherein: in each robotic luminaire agent, the suspension comprises one or more first magnetic elements, and the architectural surface comprises one or more second magnetic elements.

3. The method for operating a robotic agent swarm system according to claim 1, wherein sending, via the communication network, the reconfiguration instruction from an orchestration controller to the plurality of robotic luminaire agents comprises sending the reconfiguration instruction simultaneously to all of the plurality of robotic luminaire agents.

4. The method for operating a robotic agent swarm system according to claim 1, wherein sending, via the communication network, the reconfiguration instruction from an orchestration controller to the plurality of robotic luminaire agents comprises sending the reconfiguration instruction to an initial set of one or more robotic luminaire agents, and sending the reconfiguration instructions from the initial set of one or more robotic luminaire agents to a subsequent set of one or more robotic luminaire agents.

5. The method for operating a robotic agent swarm system according to claim 1, wherein the orchestration controller is separate from the plurality of robotic luminaire agents.

6. The method for operating a robotic agent swarm system according to claim 1, wherein at least one of the plurality of robotic luminaire agents comprises the orchestration controller.

7. The method for operating a robotic agent swarm system according to claim 1, wherein the reconfiguration trigger comprises identifying a specific time of day and the reconfiguration instruction comprises an instruction to change operating conditions of one or more of the plurality of robotic luminaire agents.

8. The method for operating a robotic agent swarm system according to claim 1, wherein the reconfiguration trigger comprises a reconfiguration request from a human user interface.

9. The method for operating a robotic agent swarm system according to claim 8, wherein the reconfiguration request comprises a request to place a light at a user-defined location.

10. The method for operating a robotic agent swarm system according to claim 9, wherein the reconfiguration instruction comprises an instruction to move one or more robotic luminaire agents to the user-defined location.

11. The method for operating a robotic agent swarm system according to claim 8, wherein the reconfiguration request comprises a request to reconfigure the one or more robotic luminaire agents to a predetermined arrangement.

12. The method for operating a robotic agent swarm system according to claim 1, further comprising generating the reconfiguration instruction.

13. The method for operating a robotic agent swarm system according to claim 12, wherein:
   generating the reconfiguration instruction comprises:
      identifying a respective current positions of each of the plurality of robotic luminaire agents, and
      identifying a respective destination position for one or more of the plurality of robotic luminaire agents; and
   the reconfiguration instruction comprises an instruction to the one or more of the plurality of robotic luminaire agents to move to the respective destination position.

14. The method for operating a robotic agent swarm system according to claim 13, further comprising:
   identifying an observed change in the one or more operating conditions of the one or more of the plurality of robotic luminaire agents;
   comparing the observed change in the one or more operating conditions of the one or more of the plurality of robotic luminaire agents to an expected change in the one or more operating conditions of the one or more of the plurality of robotic luminaire agents;
   generating a new reconfiguration instruction for at least one of the plurality of robotic luminaire agents.

15. The method for operating a robotic agent swarm system according to claim 12, wherein:
   generating the reconfiguration instruction comprises:
      identifying a respective current positions of each of the plurality of robotic luminaire agents, identifying a respective destination position for one or more of the plurality of robotic luminaire agents, and calculating a respective travel path from the respective current position to the respective destination position for each of the one or more of the plurality of robotic luminaire agents; and the reconfiguration instruction comprises an instruction to the one or more of the plurality of robotic luminaire agents to proceed on the respective travel path.

16. The method for operating a robotic agent swarm system according to claim 12, wherein:

generating the reconfiguration instruction comprises identifying a desired final configuration of the plurality of robotic luminaire agents; and the reconfiguration instruction comprises an instruction to the plurality of robotic luminaire agents to reconfigure to the desired final configuration.

17. The method for operating a robotic agent swarm system according to claim 16, wherein changing one or more operating conditions of one or more of the plurality of robotic luminaire agents in response to the reconfiguration instructions comprises:

selecting, by the plurality of robotic luminaire agents, a swarm leader;

selecting, by one or more of the robotic luminaire agents, one or more swarm followers;

operating the swarm leader to move to a final position in satisfaction of at least part of the desired final configuration; and operating the swarm followers to follow the swarm leader to the final position.

18. The method for operating a robotic agent swarm system according to claim 16, wherein changing one or more operating conditions of one or more of the plurality of agents in response to the reconfiguration instructions comprises:

selecting, by the plurality of robotic luminaire agents, a swarm coordinator;

identifying, by the plurality of robotic luminaire agents, one or more agents available for reconfiguration;

determining, by the swarm coordinator, one or more respective final destinations for the one or more robotic luminaire agents available for reconfiguration;

determining, by the swarm coordinator, one or more respective travel paths to the respective final destinations for the one or more robotic luminaire agents available for reconfiguration; and sending an instruction from the swarm coordinator to the one or more robotic luminaire agents available for reconfiguration to travel on their respective travel paths.

19. The method for operating a robotic agent swarm system according to claim 18, further comprising determining a time sequence for the one or more robotic luminaire agents available for reconfiguration to travel on their respective travel paths.

20. The method for operating a robotic agent swarm system according to claim 1, wherein changing the one or more operating conditions of the one or more of the plurality of robotic luminaire agents in response to the reconfiguration instructions comprises moving the one or more of the plurality of robotic luminaire agents to a new physical location.

21. The method for operating a robotic agent swarm system according to claim 20, wherein moving the one or more of the plurality of robotic luminaire agents to a new physical location comprises driving the one or more of the plurality of robotic luminaire agents on the architectural surface.

22. The method for operating a robotic agent swarm system according to claim 20, wherein moving the one or more of the plurality of robotic luminaire agents to a new physical location comprises tumbling the one or more of the plurality of robotic luminaire agents on the architectural surface.

23. The method for operating a robotic agent swarm system according to claim 20, wherein moving the one or more of the plurality of robotic luminaire agents to a new physical location comprises flying the one or more of the plurality of robotic luminaire agents.

24. The method for operating a robotic agent swarm system according to claim 20, wherein moving the one or more of the plurality of robotic luminaire agents to a new physical location comprises moving the one or more of the plurality of agents into a three-dimensional final configuration.

25. The method for operating a robotic agent swarm system according to claim 1, wherein changing the one or more operating conditions of the one or more of the plurality of robotic luminaire agents in response to the reconfiguration instructions comprises changing an intensity of light emitted from a controllable light source of the one or more of the plurality of robotic luminaire agents.

26. The method for operating a robotic agent swarm system according to claim 25, wherein identifying the observed change in the one or more operating conditions of the one or more of the plurality of robotic luminaire agents comprises observing the plurality of robotic luminaire agents with a camera.

27. The method for operating a robotic agent swarm system according to claim 25, wherein identifying the observed change in the one or more operating conditions of the one or more of the plurality of robotic luminaire agents comprises observing the plurality of robotic luminaire agents with a real time location system.

28. The method for operating a robotic agent swarm system according to claim 25, further comprising:

identifying a respective position of each of the plurality of robotic luminaire agents; and displaying the respective positions of each of the plurality of robotic luminaire agents on a human user interface.

29. The method for operating a robotic agent swarm system according to claim 1, further comprising:

identifying an observed change in the one or more operating conditions of the one or more of the plurality of robotic luminaire agents;

comparing the observed change in the one or more operating conditions of the one or more of the plurality of robotic luminaire agents to an expected change in the one or more operating conditions of the one or more of the plurality of robotic luminaire agents;

generating a modified reconfiguration instruction; and sending, via the communication network, the modified reconfiguration instruction to the plurality of robotic luminaire agents.

30. The method for operating a robotic agent swarm system according to claim 1, wherein the architectural surface comprises a ceiling.

31. The method for operating a robotic agent swarm system according to claim 1, wherein the architectural surface comprises a wall.

32. The method for operating a robotic agent swarm system according to claim 1, wherein the holonomic operational area comprises an area that is devoid in at least some regions thereof, of features that force the plurality of robotic luminaire agents to move along a pre-defined path.

33. The method for operating a robotic agent swarm system according to claim 1, further comprising sending, via the communication network, one or more operation signals from at least one of the plurality of robotic luminaire agents to another of the plurality of robotic luminaire agents.

34. The method for operating a robotic agent swarm system according to claim 1, wherein the communication network comprises a wireless communication network.

35. A method for operating a robotic agent swarm system, the method comprising:

sending, via a communication network, a reconfiguration instruction from an orchestration controller to a plurality of robotic luminaire agents, each of the plurality of robotic luminaire agents of the swarm system being held at least periodically against an architectural surface comprising a holonomic operational area by a suspension and having a light source configured to illuminate a region in a proximity of the architectural surface; and changing one or more operating conditions of one or more of the plurality of robotic luminaire agents in response to the reconfiguration instruction, including holonomically moving at least one of the plurality of robotic luminaire agents from a first position on the holonomic operational area to a second position on the holonomic operational area;

wherein changing the one or more operating conditions of the one or more of the plurality of robotic luminaire agents in response to the reconfiguration instructions comprises moving the one or more of the plurality of robotic luminaire agents to a new three-dimensional final configuration.

\* \* \* \* \*